US011883835B2

(12) United States Patent
Cesare et al.

(10) Patent No.: US 11,883,835 B2
(45) Date of Patent: Jan. 30, 2024

(54) SHELL CONTAINER SUITABLE FOR HOUSING A DISCRETE REFILL CONTAINER

(71) Applicant: Conopco, Inc., Englewood Cliffs, NJ (US)

(72) Inventors: Slavica Cesare, Trumbull, CT (US); Lauren Alicia Ugliuzza, Seattle, WA (US); Graham Keith Lacy, London (GB); Jonathan Edward Mason, London (GB); Gregory Lalier, Brookfield, CT (US)

(73) Assignee: Conopco, Inc., Englewood Cliffs, NJ (US)

( * ) Notice: Subject to any disclaimer, the term of this patent is extended or adjusted under 35 U.S.C. 154(b) by 183 days.

(21) Appl. No.: 16/471,155

(22) PCT Filed: Dec. 4, 2017

(86) PCT No.: PCT/EP2017/081341
§ 371 (c)(1),
(2) Date: Jun. 19, 2019

(87) PCT Pub. No.: WO2018/114301
PCT Pub. Date: Jun. 28, 2018

(65) Prior Publication Data

US 2020/0023391 A1 Jan. 23, 2020

(30) Foreign Application Priority Data

Dec. 22, 2016 (EP) .................................... 16206354

(51) Int. Cl.
*B05B 11/00* (2023.01)
*A47K 5/12* (2006.01)
(Continued)

(52) U.S. Cl.
CPC ............ *B05B 11/0054* (2013.01); *A47K 5/12* (2013.01); *B05B 11/0038* (2018.08);
(Continued)

(58) Field of Classification Search
CPC ............. B05B 11/0054; B05B 11/0038; B05B 11/00412; A47K 5/12; A47K 5/1205; B65D 41/165; B65D 47/0885; B65D 77/06
(Continued)

(56) References Cited

U.S. PATENT DOCUMENTS

| | | |
|---|---|---|
| 1,450,055 A | 3/1923 | Trumbull |
| 1,920,385 A | 1/1933 | Hamilton |

(Continued)

FOREIGN PATENT DOCUMENTS

| | | |
|---|---|---|
| AU | 2014208298 | 8/2014 |
| CA | 2160386 | 4/1997 |

(Continued)

OTHER PUBLICATIONS

Search Report and Written Opinion in PCTEP2017081341; dated Mar. 14, 2018.

(Continued)

*Primary Examiner* — Lien M Ngo
(74) *Attorney, Agent, or Firm* — Gerard J. McGowan, Jr.

(57) ABSTRACT

A discrete product refill container and a rigid outer shell container. The refill container includes a product chamber and a fitment secured thereto. The fitment includes a ledge which is suitable for resting on a ledge of the rigid outer shell container while permitting the product chamber to pass into the shell interiorly to the ledge. It may also include a rim for grasping by transfer equipment. The fitment includes a destructive cover, i.e., one which cannot readily be re-closed, so that the consumer can easily make the product
(Continued)

within the refill available for pumping, as desired. The rigid outer shell container can be snap fit closed. The refill bottle may be a pouch or a thin walled bottle, with a fitment. The fitment may serve to support the bottle in an inverted position for display or storage. The refill bottle may also include an integral ledge for support in the rigid outer shell container, instead of a discrete fitment. A modular fitment may be used which accommodates different types of closures, if desired.

7 Claims, 31 Drawing Sheets

(51) Int. Cl.

| | |
|---|---|
| ***B65D 41/16*** | (2006.01) |
| ***B65D 47/08*** | (2006.01) |
| ***B65D 75/58*** | (2006.01) |
| ***B65D 77/06*** | (2006.01) |
| ***B05B 11/02*** | (2023.01) |

(52) U.S. Cl.
CPC .......... *B05B 11/026* (2023.01); *B65D 41/165* (2013.01); *B65D 47/0885* (2013.01); *B65D 75/5883* (2013.01); *B65D 77/06* (2013.01); *A47K 5/1205* (2013.01)

(58) Field of Classification Search
USPC .......................................... 215/379; 222/105
See application file for complete search history.

(56) References Cited

U.S. PATENT DOCUMENTS

| | | | | |
|---|---|---|---|---|
| 2,338,604 | A * | 1/1944 | Silveyra | B65D 77/06 229/117.35 |
| 3,000,677 | A | 9/1961 | Thomas et al. | |
| 3,938,707 | A | 2/1976 | Schmit | |
| 4,085,867 | A | 4/1978 | Heller | |
| 4,166,553 | A | 4/1979 | Fraterrigo | |
| 4,203,567 | A | 5/1980 | Featherstone | |
| 4,573,506 | A | 4/1986 | Paoletti | |
| 5,031,798 | A | 7/1991 | Wild | |
| 5,102,010 | A * | 4/1992 | Osgar | B65D 47/36 222/541.9 |
| 5,141,134 | A | 8/1992 | Machado | |
| 5,156,299 | A | 10/1992 | De Caluwe et al. | |
| 5,273,186 | A | 12/1993 | Widmer | |
| 5,299,700 | A | 5/1994 | Beniacar | |
| 5,337,921 | A | 8/1994 | Wilson et al. | |
| 5,356,039 | A | 10/1994 | Christine et al. | |
| 5,474,212 | A | 12/1995 | Ichikawa et al. | |
| 5,579,945 | A | 3/1996 | Ichikawa et al. | |
| 5,529,224 | A | 6/1996 | Chan et al. | |
| 5,642,838 | A * | 7/1997 | Stoody | B05B 11/00412 222/105 |
| 5,873,491 | A * | 2/1999 | Garcia | B05B 11/3047 222/321.7 |
| 5,875,936 | A * | 3/1999 | Turbett | B05B 11/0094 222/536 |
| 5,938,076 | A | 8/1999 | Ganzeboom | |
| 6,142,344 | A | 7/2000 | Kai | |
| 6,164,822 | A | 12/2000 | Beer | |
| 6,412,663 | B1 | 2/2002 | Adamson, II et al. | |
| 6,345,723 | B1 | 12/2002 | Blake et al. | |
| 6,510,965 | B1 * | 1/2003 | Decottignies | B05B 11/00412 222/95 |
| 6,622,892 | B2 | 9/2003 | Vance | |
| 6,679,304 | B1 | 1/2004 | Vacca | |
| 6,752,264 | B2 | 6/2004 | Versluys | |
| 7,137,531 | B2 | 11/2006 | Arghyris et al. | |
| 7,261,221 | B2 | 8/2007 | Awbrey et al. | |
| 7,284,681 | B2 | 10/2007 | Hagihara | |
| 7,306,095 | B1 | 11/2007 | Bourque et al. | |
| D560,122 | S | 1/2008 | Fuchs et al. | |
| 7,481,336 | B2 | 1/2009 | Arghyris et al. | |
| D588,470 | S | 3/2009 | Berman | |
| D593,870 | S | 9/2009 | Wehling | |
| D610,469 | S | 2/2010 | Murray | |
| 7,762,430 | B2 | 7/2010 | Wild et al. | |
| D623,537 | S | 9/2010 | Berman | |
| 7,770,755 | B2 | 10/2010 | Arghyris et al. | |
| 7,770,762 | B2 | 10/2010 | Arghyris et al. | |
| 8,292,120 | B2 | 10/2012 | LaFlamme et al. | |
| 8,336,738 | B2 | 12/2012 | Bouix et al. | |
| D674,290 | S | 1/2013 | Berman | |
| D676,763 | S | 2/2013 | Kenmotsu et al. | |
| 8,387,614 | B2 | 5/2013 | Geser et al. | |
| 8,590,753 | B2 | 11/2013 | Marina et al. | |
| 8,763,863 | B2 | 1/2014 | Quinlan et al. | |
| 8,740,020 | B2 | 3/2014 | Marina et al. | |
| 8,640,926 | B2 | 4/2014 | McNulty et al. | |
| 8,622,243 | B2 | 7/2014 | Ophardt et al. | |
| 8,818,500 | B2 | 8/2014 | Duquet et al. | |
| 8,668,116 | B2 | 11/2014 | Ciavarella et al. | |
| 9,623,200 | B2 | 4/2017 | Holakovsky et al. | |
| 9,682,391 | B2 | 6/2017 | Baillet et al. | |
| 10,370,167 | B2 * | 8/2019 | Benson | B65D 21/0237 |
| 2005/0029291 | A1 | 2/2005 | Arghyris et al. | |
| 2005/0211724 | A1 | 9/2005 | Arghyris et al. | |
| 2006/0249540 | A1 | 11/2006 | Arghyris et al. | |
| 2007/0151987 | A1 | 7/2007 | Arghyris et al. | |
| 2009/0223998 | A1 | 9/2009 | Cameron | |
| 2010/0059550 | A1 | 3/2010 | Ciavarella et al. | |
| 2011/0024452 | A1 * | 2/2011 | Moretti | B05B 11/00412 222/105 |
| 2011/0220682 | A1 * | 9/2011 | Lim | B05B 11/3023 222/183 |
| 2012/0085782 | A1 | 4/2012 | Futori | |
| 2012/0097707 | A1 | 4/2012 | Taberlet | |
| 2012/0110960 | A1 | 5/2012 | Baud et al. | |
| 2012/0125947 | A1 | 5/2012 | Becker et al. | |
| 2012/0125948 | A1 | 5/2012 | Son et al. | |
| 2013/0175301 | A1 | 7/2013 | Ray | |
| 2013/0200097 | A1 | 8/2013 | Yang et al. | |
| 2013/0327327 | A1 | 12/2013 | Edwards et al. | |
| 2014/0103068 | A1 | 4/2014 | Son et al. | |
| 2014/0117123 | A1 | 5/2014 | Kelly | |
| 2014/0124538 | A1 | 5/2014 | Pouliaude | |
| 2014/0138402 | A1 | 5/2014 | Warren et al. | |
| 2014/0231454 | A1 | 8/2014 | Rossignol | |
| 2014/0231461 | A1 | 8/2014 | Rossignol | |
| 2014/0263464 | A1 | 9/2014 | Corney | |
| 2014/0286689 | A1 | 9/2014 | Jung | |
| 2016/0354795 | A1 | 12/2016 | Taberlet et al. | |
| 2017/0081086 | A1 * | 3/2017 | Fiere | B65D 51/18 |
| 2017/0113236 | A1 | 4/2017 | Taberlet et al. | |
| 2017/0120275 | A1 | 5/2017 | Puviland et al. | |

FOREIGN PATENT DOCUMENTS

| | | |
|---|---|---|
| CA | 2461393 | 9/2005 |
| CA | 2524957 | 5/2006 |
| CA | 2447776 | 1/2011 |
| CN | 203359173 | 12/2013 |
| CN | 203410790 | 1/2014 |
| CN | 103565083 | 2/2014 |
| CN | 203801935 | 9/2014 |
| CN | 203914723 | 11/2014 |
| CN | 203914725 | 11/2014 |
| CN | 104229302 | 12/2014 |
| CN | 204038079 | 12/2014 |
| CN | 204096310 | 1/2015 |
| CN | 104340502 | 2/2015 |
| CN | 104443783 | 3/2015 |
| DE | 4224843 | 2/1994 |
| EA | 2397421 | 2/2016 |
| EP | 0007021 | 1/1980 |
| EP | 0380348 | 1/1990 |
| EP | 0466225 | 2/1994 |
| EP | 0299734 | 4/1994 |
| EP | 0970634 | 1/2003 |

(56) References Cited

FOREIGN PATENT DOCUMENTS

| | | |
|---|---|---|
| EP | 2127580 | 12/2009 |
| EP | 1412263 | 3/2010 |
| EP | 2216287 | 8/2010 |
| EP | 2039621 | 7/2013 |
| EP | 2669214 | 12/2013 |
| EP | 2752373 | 7/2014 |
| EP | 2323923 | 11/2014 |
| EP | 2837580 | 2/2015 |
| EP | 2842880 | 3/2015 |
| ES | 2498690 | 6/2015 |
| FR | 1183915 | 7/1959 |
| FR | 2427960 | 1/1984 |
| FR | 2670661 | 6/1992 |
| FR | 2715636 | 4/1996 |
| FR | 3037260 | 12/2016 |
| GB | 2155117 | 4/1987 |
| GB | 2432823 | 6/2008 |
| JP | 58108911 | 6/1983 |
| JP | 1503214 | 11/1989 |
| JP | 5094150 | 12/1993 |
| JP | H0603280 | 1/1994 |
| JP | 6032380 | 2/1994 |
| JP | 6048466 | 2/1994 |
| JP | 6127579 | 5/1994 |
| JP | 6135474 | 5/1994 |
| JP | 3009099 | 3/1995 |
| JP | 08011960 | 1/1996 |
| JP | 8192872 | 7/1996 |
| JP | 2568722 | 10/1996 |
| JP | 9086564 | 3/1997 |
| JP | 09512474 | 12/1997 |
| JP | 2563325 | 2/1998 |
| JP | H10101094 | 4/1998 |
| JP | 2575244 | 6/1998 |
| JP | 2577412 | 7/1998 |
| JP | 3062495 | 8/1998 |
| JP | 2587885 | 12/1998 |
| JP | 11091824 | 4/1999 |
| JP | 11222266 | 8/1999 |
| JP | 11292171 | 10/1999 |
| JP | 2000007031 | 1/2000 |
| JP | 2000085867 | 3/2000 |
| JP | 2000185768 | 7/2000 |
| JP | 2000211671 | 8/2000 |
| JP | 2000238824 | 9/2000 |
| JP | 2001019013 | 1/2001 |
| JP | 2001072151 | 3/2001 |
| JP | 2001294268 | 10/2001 |
| JP | 2001335087 | 12/2001 |
| JP | 2001341780 | 12/2001 |
| JP | 3084981 | 4/2002 |
| JP | 2002104546 | 4/2002 |
| JP | 2002225940 | 8/2002 |
| JP | 2002240856 | 8/2002 |
| JP | 2003012067 | 1/2003 |
| JP | 2003175988 | 6/2003 |
| JP | 2003192028 | 7/2003 |
| JP | 2003292073 | 10/2003 |
| JP | 3111398 | 7/2005 |
| JP | 2005239223 | 9/2005 |
| JP | 2005255215 | 9/2005 |
| JP | 3826964 | 9/2006 |
| JP | 3859891 | 12/2006 |
| JP | 3942830 | 7/2007 |
| JP | 3966957 | 8/2007 |
| JP | 3973896 | 9/2007 |
| JP | 3973897 | 9/2007 |
| JP | 4046939 | 2/2008 |
| JP | 4094159 | 6/2008 |
| JP | 4108831 | 6/2008 |
| JP | 2008213932 | 9/2008 |
| JP | 2008285178 | 11/2008 |
| JP | 2008296923 | 12/2008 |
| JP | 4250037 | 4/2009 |
| JP | 31521177 | 7/2009 |
| JP | 2009173327 | 8/2009 |
| JP | 2010500245 | 1/2010 |
| JP | 2010095276 | 4/2010 |
| JP | 2010095277 | 4/2010 |
| JP | 2010095278 | 4/2010 |
| JP | 3159981 | 6/2010 |
| JP | 4615381 | 1/2011 |
| JP | 3165984 | 2/2011 |
| JP | 4828345 | 11/2011 |
| JP | 4858956 | 1/2012 |
| JP | 2012076036 | 4/2012 |
| JP | 4958148 | 6/2012 |
| JP | 4966714 | 7/2012 |
| JP | 2012153426 | 8/2012 |
| JP | 2012201387 | 10/2012 |
| JP | 5087336 | 12/2012 |
| JP | 5097004 | 12/2012 |
| JP | 5127417 | 1/2013 |
| JP | 5128476 | 1/2013 |
| JP | 2013500907 | 1/2013 |
| JP | 5142015 | 2/2013 |
| JP | 5158705 | 3/2013 |
| JP | 5160964 | 3/2013 |
| JP | 5208876 | 6/2013 |
| JP | 5250492 | 7/2013 |
| JP | 1476287 | 8/2013 |
| JP | 5257926 | 8/2013 |
| JP | 5264275 | 8/2013 |
| JP | 5264295 | 8/2013 |
| JP | 5268451 | 8/2013 |
| JP | 2013165976 | 8/2013 |
| JP | 1480132 | 9/2013 |
| JP | 5307600 | 10/2013 |
| JP | 5322732 | 10/2013 |
| JP | 5285918 | 11/2013 |
| JP | 5352419 | 11/2013 |
| JP | 2013544143 | 12/2013 |
| JP | 5386733 | 1/2014 |
| JP | 5404794 | 2/2014 |
| JP | 5409477 | 2/2014 |
| JP | 5409478 | 2/2014 |
| JP | 2014036707 | 2/2014 |
| JP | 5485097 | 5/2014 |
| JP | 2014080239 | 5/2014 |
| JP | 2014101142 | 6/2014 |
| JP | 2014105003 | 6/2014 |
| JP | 2014128539 | 7/2014 |
| JP | 2014147487 | 8/2014 |
| JP | 2014151947 | 8/2014 |
| JP | 2014523378 | 9/2014 |
| JP | 5599772 | 10/2014 |
| JP | 5610782 | 10/2014 |
| JP | 2014196130 | 10/2014 |
| JP | 2014213940 | 11/2014 |
| JP | 2014227197 | 12/2014 |
| JP | 2014231362 | 12/2014 |
| JP | 2014237454 | 12/2014 |
| JP | 5650502 | 1/2015 |
| JP | 2015009863 | 1/2015 |
| JP | 2015040065 | 3/2015 |
| JP | 2015044611 | 3/2015 |
| JP | 5719034 | 5/2015 |
| KR | 200454469 | 7/2011 |
| WO | WO9013509 | 11/1990 |
| WO | WO9520540 | 8/1995 |
| WO | WO9726998 | 7/1997 |
| WO | WO03011713 | 2/2003 |
| WO | WO2004054721 | 7/2004 |
| WO | WO2005077546 | 8/2005 |
| WO | WO2010025392 | 3/2010 |
| WO | WO2010051077 | 5/2010 |
| WO | WO2010125304 | 11/2010 |
| WO | WO2012102814 | 8/2012 |
| WO | WO2013103589 | 7/2013 |
| WO | WO2014050373 | 4/2014 |
| WO | WO2014102793 | 7/2014 |
| WO | WO2014120760 | 8/2014 |
| WO | WO2014199288 | 12/2014 |
| WO | WO2015001269 | 1/2015 |

(56) References Cited

FOREIGN PATENT DOCUMENTS

| | | |
|---|---|---|
| WO | WO2015004360 | 1/2015 |
| WO | WO2015028564 | 3/2015 |
| WO | WO2015189489 | 12/2015 |
| WO | WO2016113317 | 7/2016 |
| WO | WO2016193319 | 12/2016 |

OTHER PUBLICATIONS

Repairing Anti-Deep-Set Wrinkle Firming Cream; Mintel L'Oréal Dermo—Expertise RevitaLift; Mar. 2008; pp. 1-3.
Airless pouch dispenser; Lablabo; pp. 1-2, Accessed on Aug. 11, 2017, http://www.lablabo.com/en/product/ellipse-line/.
Milk pouch could replace bottle; BBC News; Jun. 25, 2007; pp. 1-2, Retrieved from internet: http://news.bbc.co.uk/1/hi/wales/south_west/6237438.stm.
Plastic Milk Bags, United Kingdom; packaging-gateway.com; pp. 1-3, Retrieved from the internet on Aug. 23, 2017 from: http://www.packaging-gateway.com/projects/milkbags/.
Lablabo: France's driving force behind the airless pouch dispenser; webpackaging.com; Aug. 3, 2016; pp. 1-6, Retrieved from internet: https://www.webpackaging.com/en/portals/lablabo/assets/11268165/lablabo-frances-driving-force-behind-the-airless-pouch-dispenser/.
Lucy Siegle; Is this the end of the milk bottle?; theguardian.com; Jun. 24, 2007; pp. 1-2, Retrieved from the internet: https://www.theguardian.com/lifeandstyle/wordofmouth/2007/jun/24/isthistheendofthemilkbo.
Rebecca Smithers; Waitrose shelves eco-friendly milk containers; theguardian.com; Apr. 15, 2010; pp. 1-3, Retrieved from internet: https://www.theguardian.com/environment/2010/apr/15/waitrose-milk-containers.
No More Spills How It Works; The Nevada Milk Bag Pitcher; pp. 1-3, Retrieved from the internet on Aug. 22, 2017: http://nevadamilkbagpitcher.yolasite.com/nevada-milk-bag-pitcher.php.
No More Spills Now Available in 2 Sizes; The Nevada Milk Bag Pitcher; pp. 1-2, Retrieved from the internet on Aug. 22, 2017 from: http://nevadamilkbagpitcher.yolasite.com/.
What's new in Lablabo's HEAD?; webpackaging.com; Jun. 1, 2013; pp. 1-3, Retrieved from internet: https://www.webpackaging.com/en/portals/lablabo/assets/11144278/whats-new-in-lablabos-head/.
Ellipse line of airless pouch dispensers; webpackaging.com; pp. 1-1, Retrieved from the internet on Aug. 23, 2017 from: https://www.webpackaging.com/en/portals/lablabo/assets/11305613/ellipse-line-of-airless-pouch-dispensers/.
About the Milk Bag Pitcher (No More Spills); Milk Bag Pitcher; pp. 1-3, Retrieved from the internet: http://milkbagpitcher.yolasite.com/about-the-pitcher.php.
Milk pouches squeeze out bottles; BBC News ; Aug. 14, 2001; pp. 1-2, Retrieved from the internet: http://news.bbc.co.uk/1/hi/uk/1490691.stm.
Eco Pak; calonwen-cymru.com/eco-pak; Aug. 12, 2007; pp. 1-1, Retrieved from the internet: http://web.archive.org/web/20070812011629/http:/www.calonwen-cymru.com/eco-pak.
Rupert Neate; Milk in bags hits Sainsbury's shelves; telegraph.co.uk; Jun. 9, 2008; pp. 1-2, Retrieved from internet: http://www.telegraph.co.uk/news/uknews/2098737/Milk-in-bags-hits-Sainsburys-shelves.html.
Lablabo Exhibits at Pharmapack 2017; packaging-gateway.com; Mar. 8, 2017; pp. 1-1, Retrieved from internet: http://www.packaging-gateway.com/contractors/containers/lablabo/presslablabo-exhibits-at-pharmapack-2017.html.
Sainsbury's Launching Milk in Bag Packaging; Sustainable is Good.com; Jun. 10, 2008; pp. 1-2, Retrieved from the internet: http://www.sustainableisgood.com/blog/2008/06/milk.html.
MIT Dem Milchbeutel Gegen Kunststoff-Abfall; Pack Aktuell; Aug. 13, 2009; pp. 1-3, No translation available, Retrieved from the internet: http://www.packaktuell.ch/newspool/mit-dem-milchbeutel-gegen-kunststoff-abfall/.
Method Ocean Plastic; Sustainable is Good.com; Jul. 29, 2013; pp. 1-2, Retrieved from internet: http://www.sustainableisgood.com/blog/2013/07/method-ocean-plastic.html.
Tom's of Maine Looking Towards Potato Based PLA Packaging; Sustainable is Good.com; Jul. 31, 2013; pp. 1-10, Retrieved from the internet: http://www.sustainableisgood.com/blog/.
Questel Designs; LABLABO; 2000; pp. 1-4.
IPRP in PCTEP2017081341; Mar. 21, 2019.
Search Report and Written Opinion in EP21170252; .; dated Nov. 16, 2021.

* cited by examiner

SHELL CONTAINER SUITABLE FOR HOUSING A DISCRETE REFILL CONTAINER

BACKGROUND OF THE INVENTION

Concern has been growing among consumers and businesses alike about the sustainability of consumer products. For example, although consumers often appreciate products in plastic containers, such products are sometimes disposed of in landfills, taking up valuable space and contributing unwanted materials to the environment. Some consumer product packaging is recyclable, but recycling requires effort and energy.

One way to minimize the waste resulting from consumer products is to encourage re-use of packages. However, this also entails additional effort, which consumers are not always willing to undertake. Moreover, consumers do not always recognize the possibilities for re-using packaging.

An additional possibility is to provide refills with minimal packaging. Refill bags and related products are known. These and other packaging items are disclosed in Shibata CN 104229302, Marina et al. U.S. Pat. Nos. 8,590,753 and 8,740,020, "About the Milk Bag Pitcher" accessed from the Internet on Aug. 12, 2015, Schmit U.S. Pat. No. 3,938,707, Quinlan et al. AU application No. 2014208298, Ray US Patent application Publication No. 2013/0175301, Yoshida WO 2014/050373, Ding CN 104340502, Wei CN 104443783, Wei CN 204096310, Rossignol US 20140231454, Yean CN204038079, Yinghai CN203914725, JP 2015-44611, JP2014-80239, JP 2014-196130, JP 2014-213940, Pryor EP 2216287, Tadaaki JP publication No. 2000-007031 and Machado U.S. Pat. No. 5,141,134.

Others include Madhaven GB 2432823, Albisetti EP 970634, Cameron US 2009/0223998, JP3159981U, JP03152177U, JP 1480132S, JP14762875, Hasegawa KR454469Y1, JP 2014036707, JPH0603280A, JPH09512474A, JP2014101142A, JP4108831B2, JP382694B, JP2010095276A, JP2010095278A, JP2008296923A, JP3165984u, JP2001072151A, JP2563325Y, JP2000185768A, JP2000211671A, JPS58108911U, JP5610782B2, JPH 08011960, JP2002240856A, JP5087336B2, JP4094159B2, JP516096B2, JPH05094150U, JP2003292073A, JP538733B2, JP5097004B2, JP2568722Y, JP2015-40065, JP2014-231362, JP2014-227197, JPH06048466, JP 3062495u, US 2010059550, JP5128476B2, JP5599772B2, JP5285918B2, JP2001294268A, JP3009099U, JP2014105003A, JP 2010500245A, and Rieke airless pump brochure.

It is believed that in order to enjoy acceptance by consumers, refills need to be convenient to use and attractive. Also challenging is to present refill containers attractively on the shelf while minimizing secondary and primary packaging. The refill's manner of operation should be evident to consumers, as well. Thus, the present invention seeks to provide consumers with a refill which they will be willing to use and will enjoy using.

SUMMARY OF THE INVENTION

In a first aspect, the invention is directed to a discrete product refill container suitable for being accommodated within a rigid outer shell container. The refill container includes a product chamber and a separate fitment secured thereto. Preferably the product chamber of the refill is thin walled and/or flexible so that the amount of materials used and the environmental impact are minimized. More preferably, weight of the bottle walls (i.e., below the neck of the bottle) is reduced by at least 40%, preferably at least 50% over traditional primary pack bottles.

In the case of a refill comprising a flexible material such as a flexible pouch, the fitment serves to support the pouch on a supporting surface of the rigid outer shell container. Where the refill is a thin walled bottle, the fitment may serve both to support the bottle on a support surface of the rigid outer shell container and additionally to support the bottle in an inverted position when it is removed from the outer shell container for display or storage.

The refill is preferably used with the rigid outer container, which includes a rigid reservoir to contain most of the refill, and a closure. The refill fitment includes a ledge or resting surface which extends, at least in part, radially beyond an inner circumference of a supporting surface, typically in the upper aspects of the rigid outer product reservoir. The supporting surface may be a rim associated with an inner wall of the rigid outer product reservoir. Alternatively, the mouth of the rigid outer product reservoir includes a separate refill support ring, and the fitment ledge extends beyond the inner circumference of the supporting surface of the support ring.

The ledge of the fitment is suitable for resting on the supporting surface of the rigid outer container while permitting the refill's product chamber to pass into the shell interiorly of the rim or other supporting surface. The fitment preferably includes a destructive cover, i.e., one which cannot readily be re-closed, so that the consumer can easily make the product within the refill available for pumping, as desired. Conveniently, the fitment may include one or more finger recesses, e.g. on either side of the destructive cover. If desired, the fitment may be modular to permit the addition of snap-on features to provide additional functional benefits.

Both the fitment and the product chamber and/or any support ring are preferably of a very similar shape to that of the rigid outer container's product reservoir, e.g., an oval shape, thereby minimizing rotation of the refill and fitment within the product reservoir. Alternatively, the product chamber of the refill comprises a thin walled bottle. Where the refill comprises a thin walled bottle, the destructive cover can be in the fitment or in the bottle itself.

The fitment for the thin walled bottle may include a medial tube extending upwardly from a bottom wall surrounded by front, rear and first and second side walls which terminate in ledges at an upper end which are disposed above the level of the top of the medial tube. The ledges are suitable for supporting the fitment and the refill bottle when the bottle rests on the fitment. The fitment includes at least three corners extending upwardly and outwardly from the bottom wall to intersections of the front, rear, first and/or second side wall ledges whereby to afford at least three surfaces on which the fitment can be supported in the rigid container mouth, or on the refill support ring disposed in a rigid container mouth. Alternatively, the rigid outer container mouth and/or fitment may include protuberances which permit the upper end of the fitment to rest in an upper end of the container mouth.

The fitment associated with the thin walled bottle plays several roles in the invention. It serves to support the refill bottle so that it can be displayed on the shelf or conveniently stored in the consumer's home in an inverted position with minimal secondary packaging. Also, the bottle fitment is used to support the bottle in the outer shell container in which the refill will be used by the consumer to dispense the product. The outer shell container is substantial enough to be sufficiently rigid to support itself and the refill contained within whereas the refill may be made of less substantial, e.g., lighter weight, material whereby to conserve resources and minimize insult to the environment.

In yet another aspect, the invention is directed to a refill container comprising a thin-walled bottle and a mouth surrounded, in part or in whole, directly or indirectly, by an integral ledge for resting the refill on the supporting surface of a rigid outer product reservoir. In this aspect, the discrete refill support ring within the rigid outer container's product reservoir and the fitment can be omitted.

In another aspect, the invention comprises the outer rigid container suitable for housing a discrete refill container. If desired, in this aspect, the refill bottle may stand upright on shelf and will be inserted into the rigid housing in the upright position as well. The container includes a rigid product reservoir extending axially and having an opening at one axial or upper end. A closure unconnected to the rigid product reservoir can be snap fit axially or vertically onto the rigid product reservoir to cover the opening. Preferably, the closure has one or more protuberances which can be accommodated within one or more recesses on the rigid product reservoir when the closure snaps closed. The rigid product reservoir also includes the supporting surface or rim for supporting the ledge of the refill container.

The rigid outer container of the invention may include a spring associated with the underside of the closure, which urges the protuberance into the recess on the rigid product reservoir when the closure is snap fit onto the reservoir. A button may be attached to the spring so that pressing on the button urges the protuberance out of the recess, whereby to release the closure and permit opening of the package. The closure may include a pump associated therewith.

Generally, the bottom end of the rigid reservoir will be closed: the rigid reservoir will typically comprise a base wall covering the bottom end and sidewalls extending upwardly from the base wall to the uppermost edge which defines a mouth of the rigid reservoir. There may be a small drain hole at the base of the rigid reservoir to prevent water buildup should the refill be changed in the shower.

As illustrated, the closure is snap fit onto the rigid reservoir, e.g., with the protuberance/recess arrangement described, rather than secured onto the reservoir by locking closure threads engaging circumferential threads on the reservoir or the refill container. It is believed that the consumer will find the snap fit arrangement of the outer rigid container convenient to use, particularly when combined with one or more clearly visible buttons suggesting the mode of operation.

In another aspect, the invention relates to the package comprising the combined outer container and the discrete refill container. The outer shell package includes a mouth containing a supporting surface. The supporting surface may be a rim directly or indirectly surrounded by the mouth. The mouth has a larger circumference than that of the fitment, whereby the fitment can be inserted into the shell package through its mouth and sit on the rim or other supporting surface.

At least two points on the circumference of the fitment constitute a ledge and extend outwardly further than the inner circumference of the supporting surface of the rigid reservoir of the outer container so that the fitment can rest on the supporting surface. The fitment may include small or large protuberances; or the ledge may include a continuous or partly continuous circumference of the fitment for resting on the supporting surface.

The presence of the supporting surface on the upper aspects of the rigid product reservoir of the outer container together with the ledge or other supporting surfaces on the fitment permits the refill to be supported at its upper end in the rigid outer container thereby permitting the refill product chamber to be made of lighter weight, less substantial, less environmentally damaging, materials. If, in contrast, the product chamber of the refill had to be self-supporting, then more substantial, potentially environmentally burdensome, materials would likely be required.

If desired, the fitment may be provided with structure to facilitate gripping during transfer.

In still another aspect, the invention is directed to the package formed by the combination of the rigid outer shell container with the refill container comprising a thin-walled bottle and a mouth surrounded, directly or indirectly, by the integral ledge for resting the refill on the supporting surface of the rigid outer package. The outer shell package includes a mouth containing the supporting surface. The supporting surface may be a rim directly or indirectly surrounded by the mouth. The mouth has a larger circumference than that of the integral ledge of the refill, whereby the refill can be inserted into the shell package through its mouth and sit on the rim or other supporting surface.

The closure may contain an airless pump whereby to conveniently and efficiently evacuate the pouch during use.

In another aspect of the invention, the outer package shell may be used to package more than one brand or type of product whereby the same refill package may be used for different products. Thus, in addition to the refill and outer package described above, the invention also comprises the method of utilizing them to present the same refill package for different products.

The refill container may house any of a variety of products, especially consumer products such as shampoos, body washes, liquid soaps, other liquid washing products, liquid skin care products such as lotions, etc.

For a more complete understanding of above and other features and advantages of the invention, reference should be made to the following detailed description of preferred embodiments and the accompanying drawings.

FIG. **6*a*** is a perspective, exploded view of a fitment used in the invention.

Figure 6A:
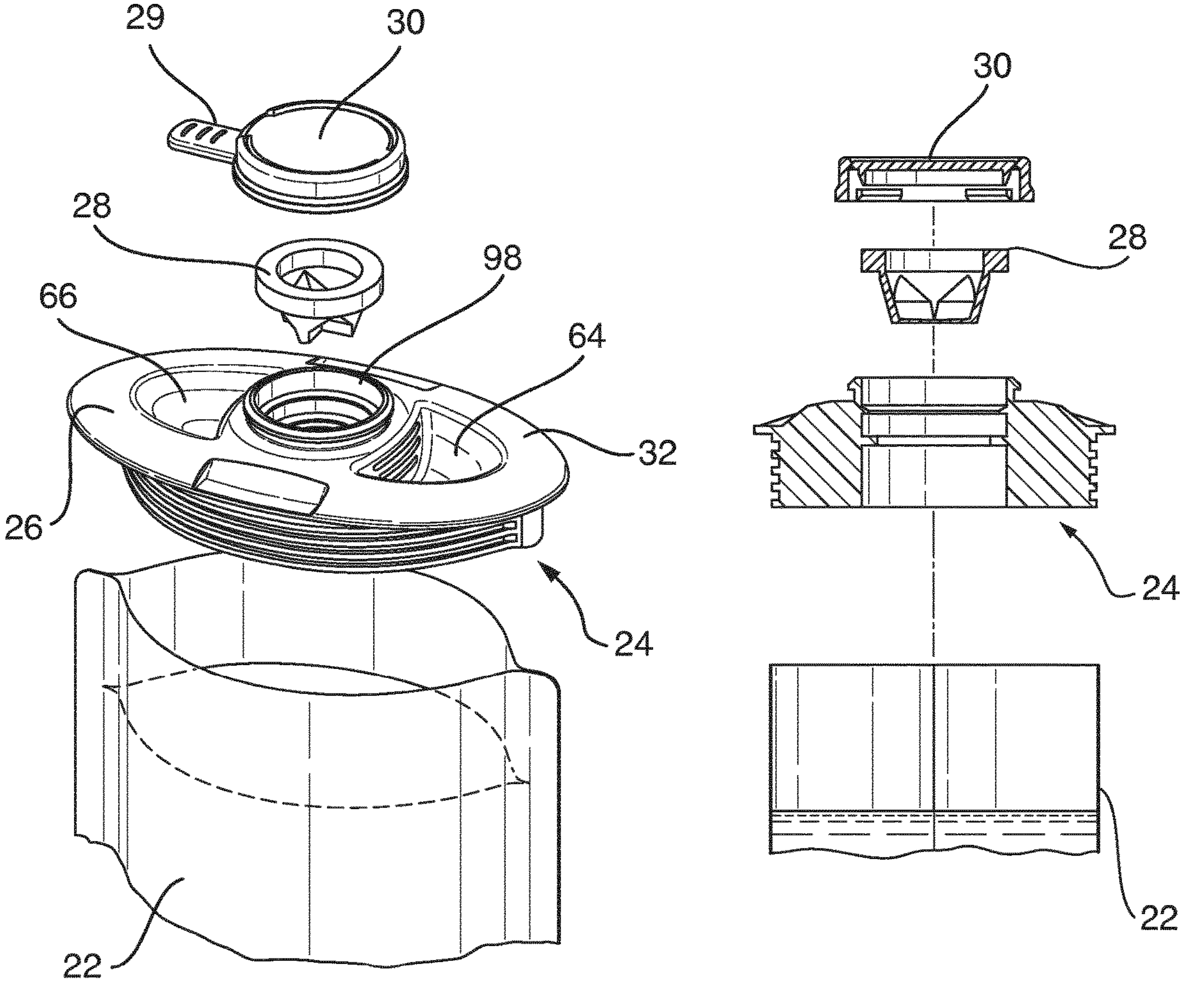
Figure 6B:
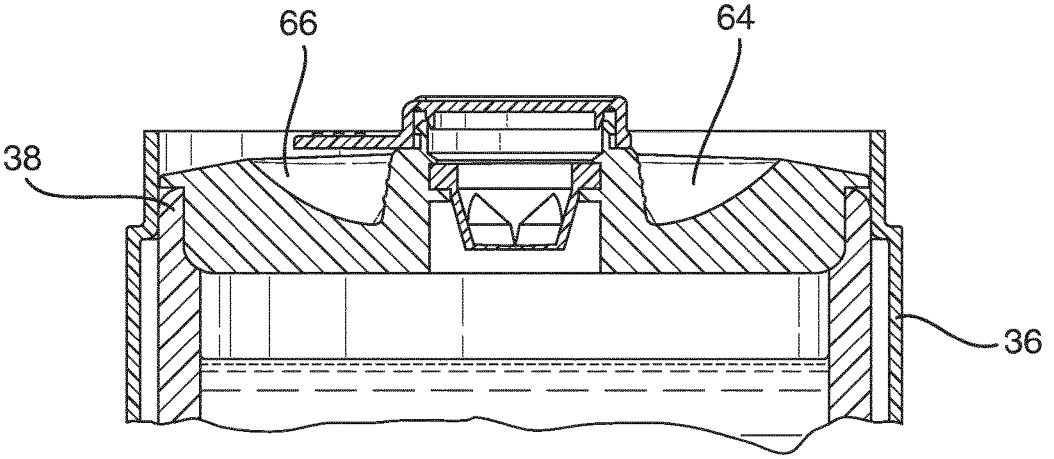

FIG. **6*b* is a partial cross section of the combined rigid outer reservoir and refill, showing the fitment of FIG. 6*a*** and the product chamber in place within the outer container.

Figure 7:
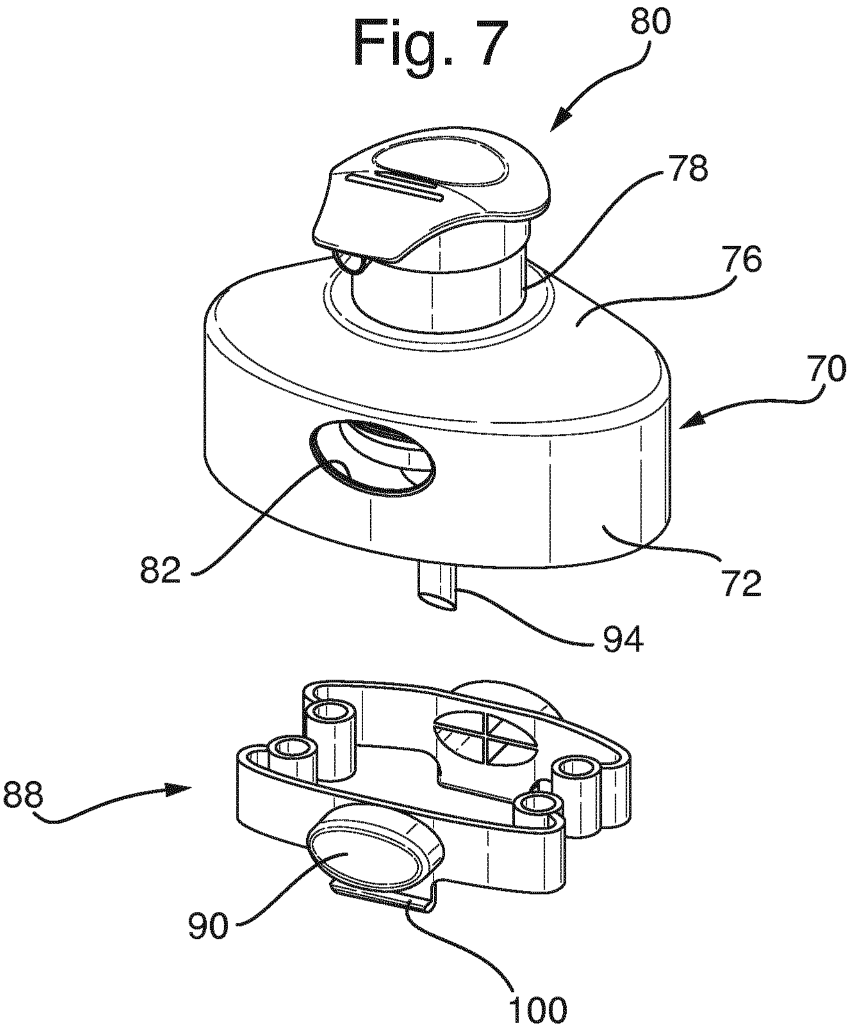

FIG. 7 is a perspective exploded view of the spring, buttons and closure used in the invention.

Figure 8:
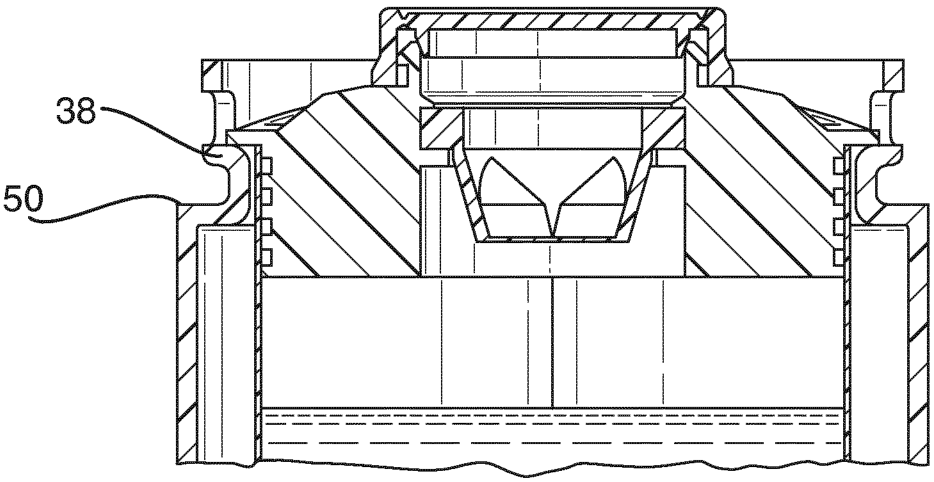

FIG. 8 is a cross section similar to that of FIG. **6*b***, except offset 90°.

Figure 9:
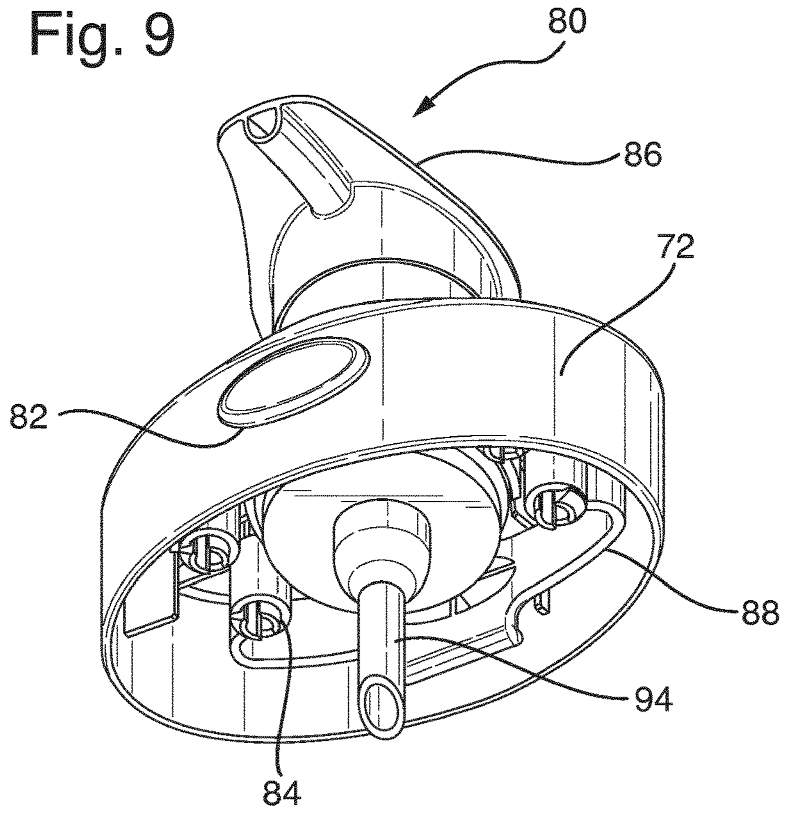

FIG. 9 is a perspective view from below of the closure and pump used in the invention.

Figure 10:
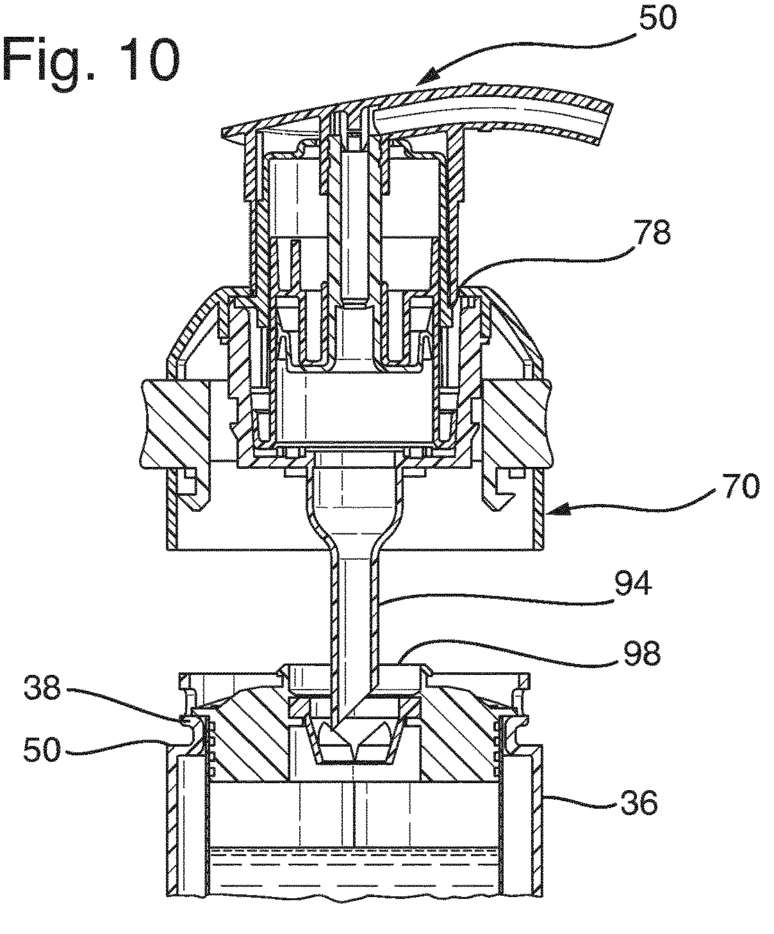

FIG. 10 is an exploded cross section of the closure, package and refill of the invention.

Figure 11:
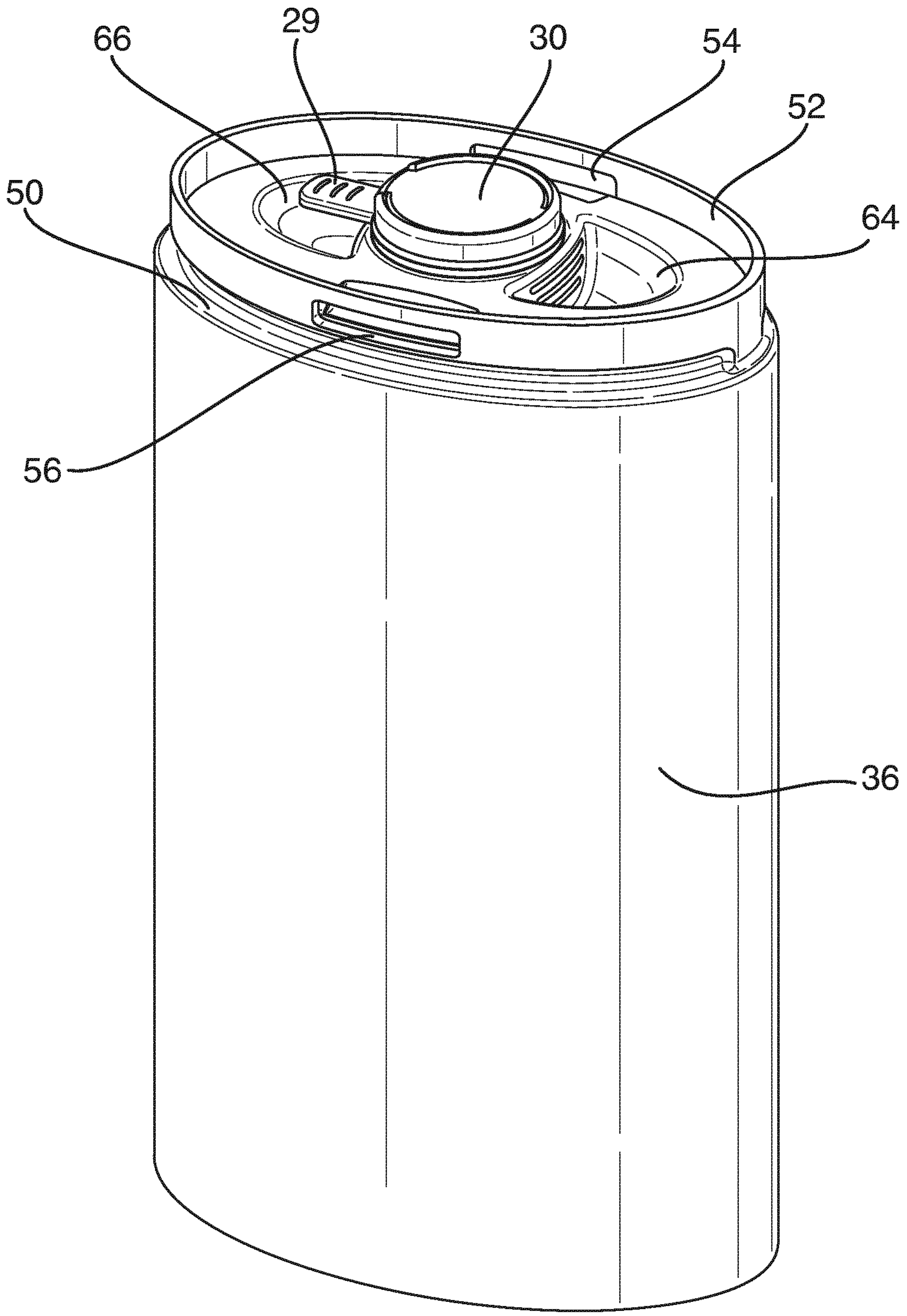

FIG. 11 is a perspective view of the outer rigid shell container and fitment of the invention.

Figure 12:
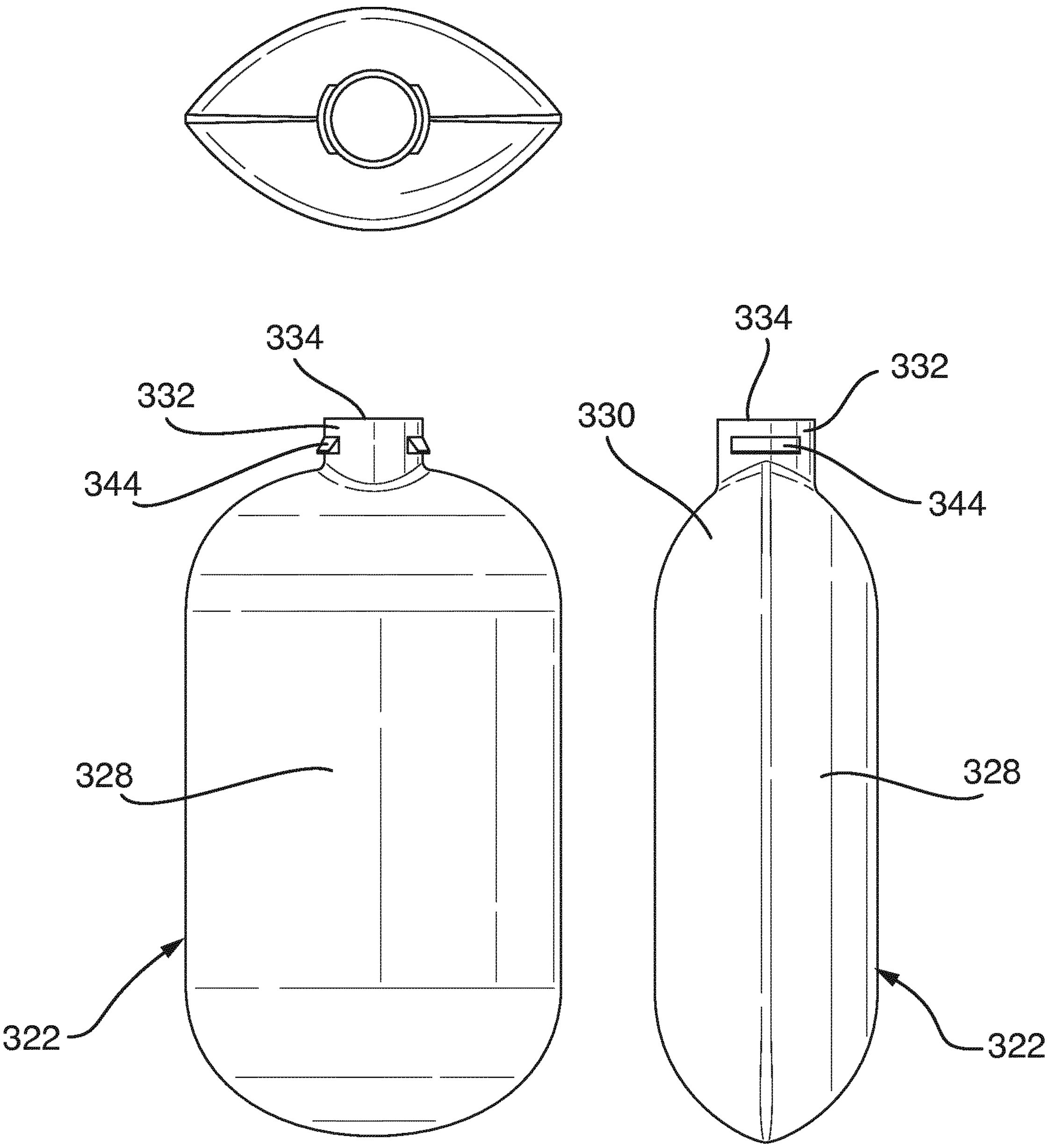

FIG. 12 provides front and side elevation, and top plan, views of the bottle used in an alternative refill of the invention.

Figure 13:
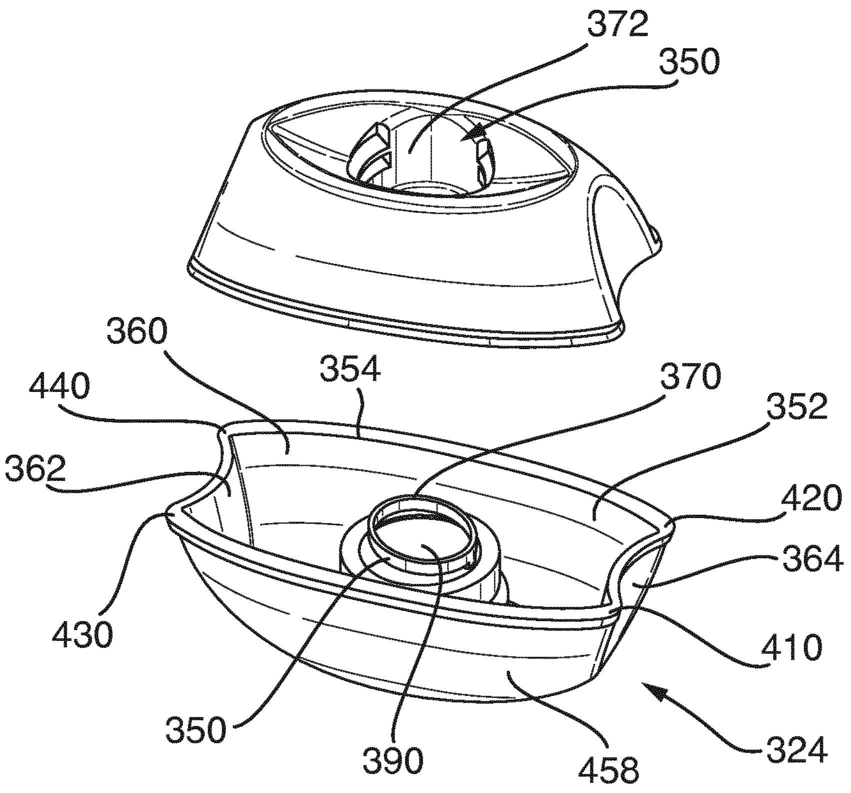

FIG. 13 shows top and bottom perspective views of an alternative fitment used in the refill container of the invention.

Figure 14:
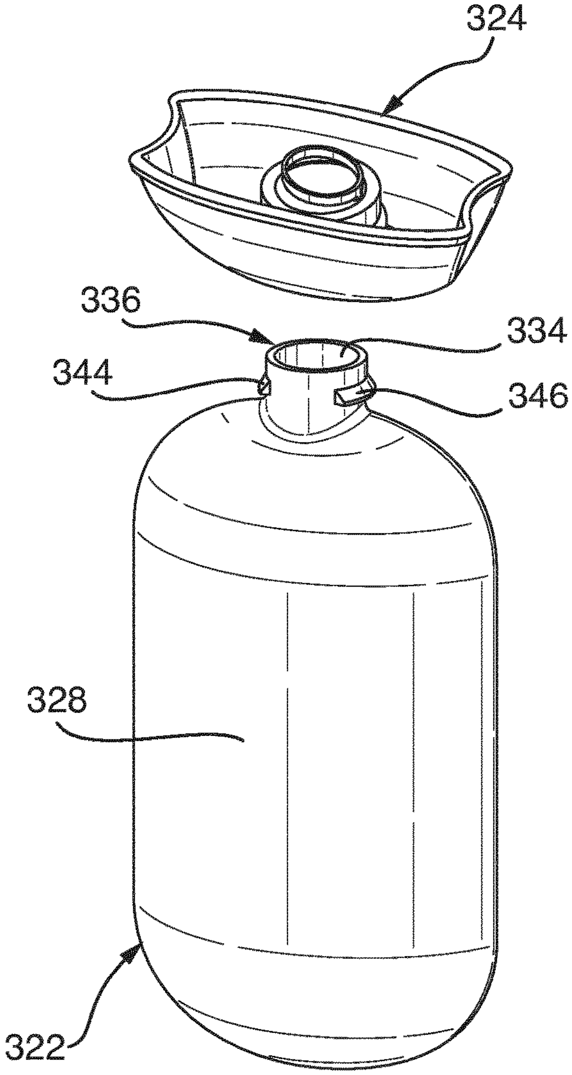

FIG. 14 is a perspective view of the alternative refill bottle showing the fitment prior to being joined to the bottle.

Figure 15:
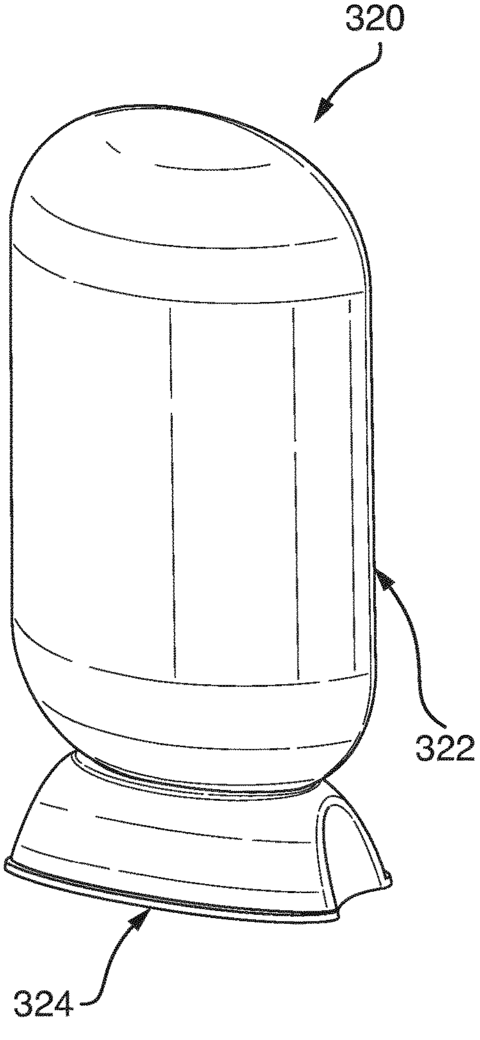

FIG. 15 is a perspective view of the alternative refill bottle of the invention supported by the fitment as it might appear on the shelf.

Figure 16:
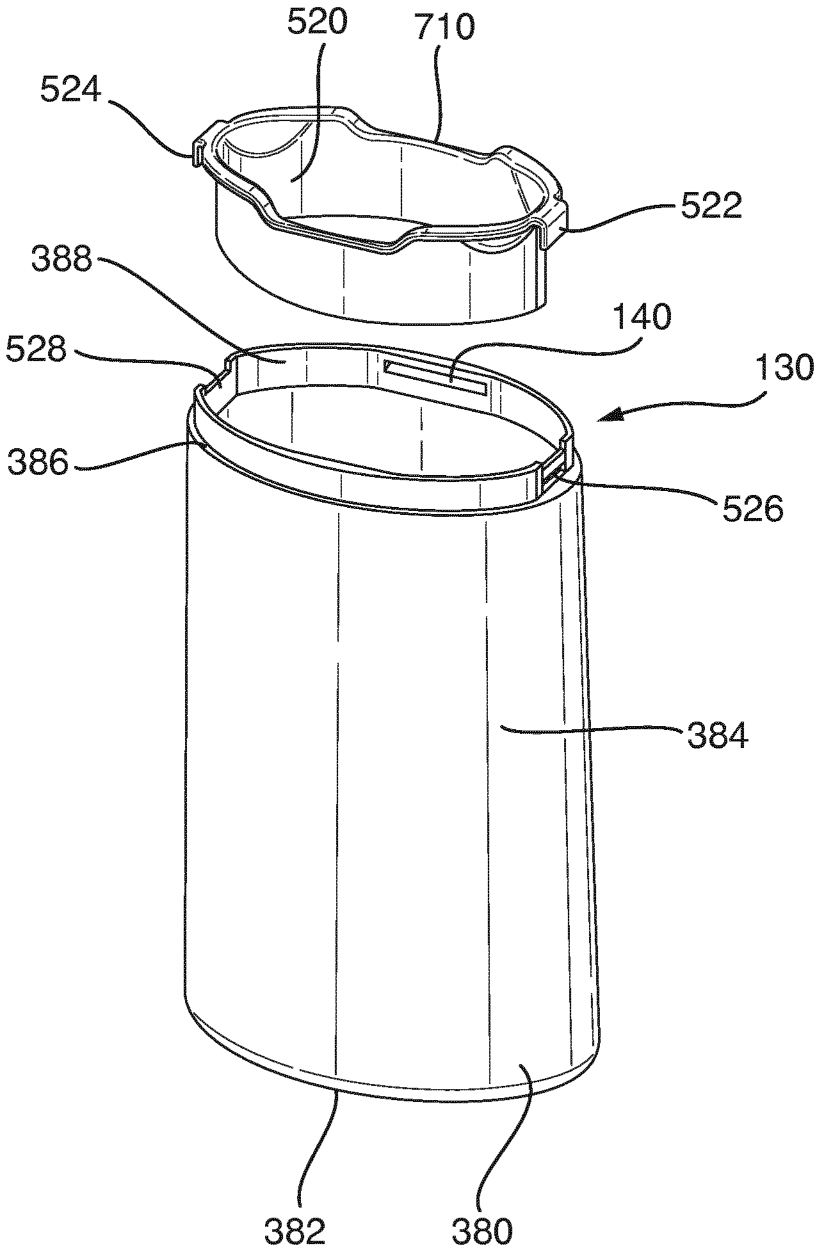

FIG. 16 is a perspective view of an alternative outer rigid shell container for the refill together with a refill support ring.

Figure 17:
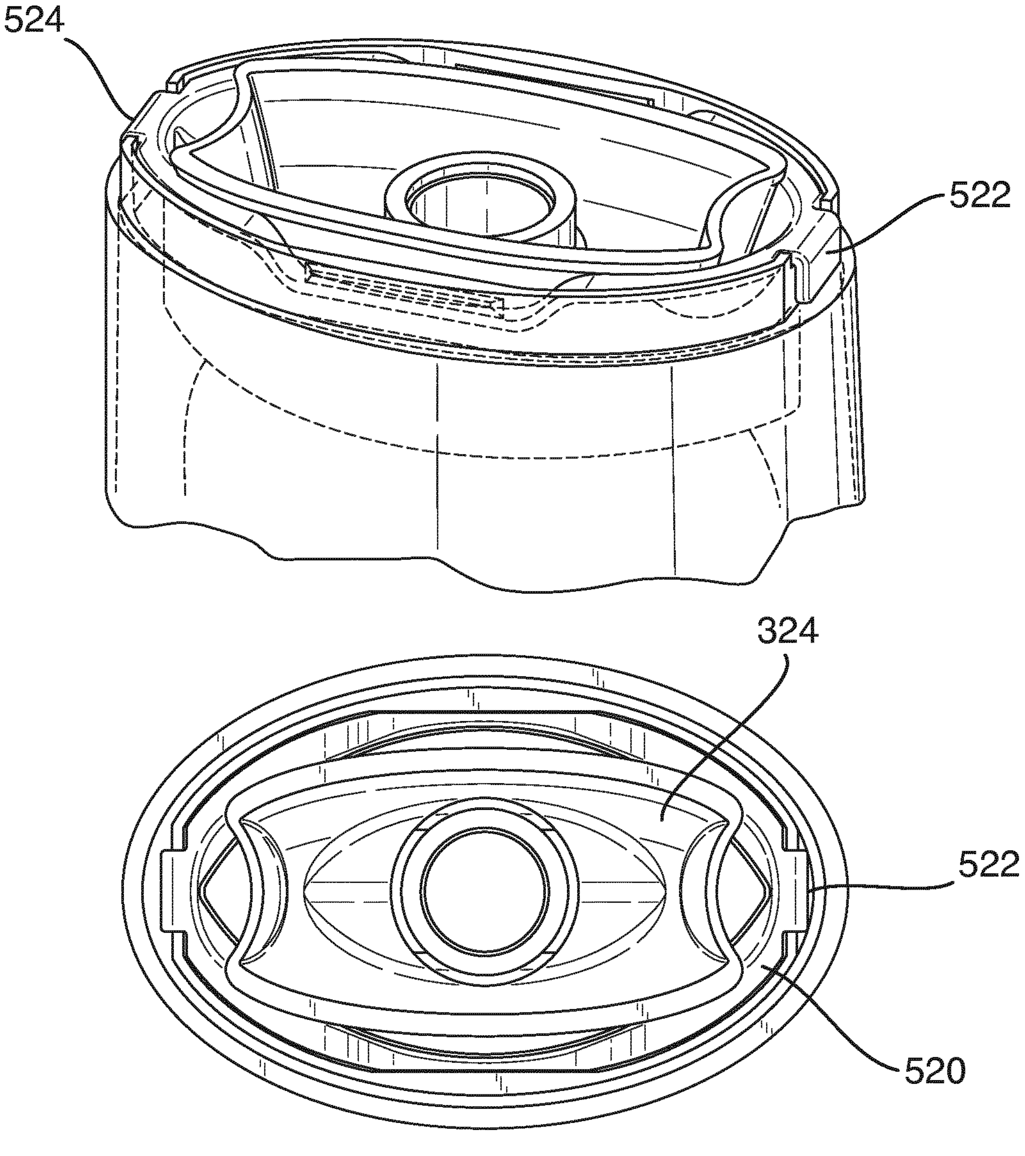

FIG. 17 includes perspective and top plan views of an upper portion of the rigid outer shell container of FIG. 16 combined with the refill support ring and the alternative refill fitment.

Figure 18:
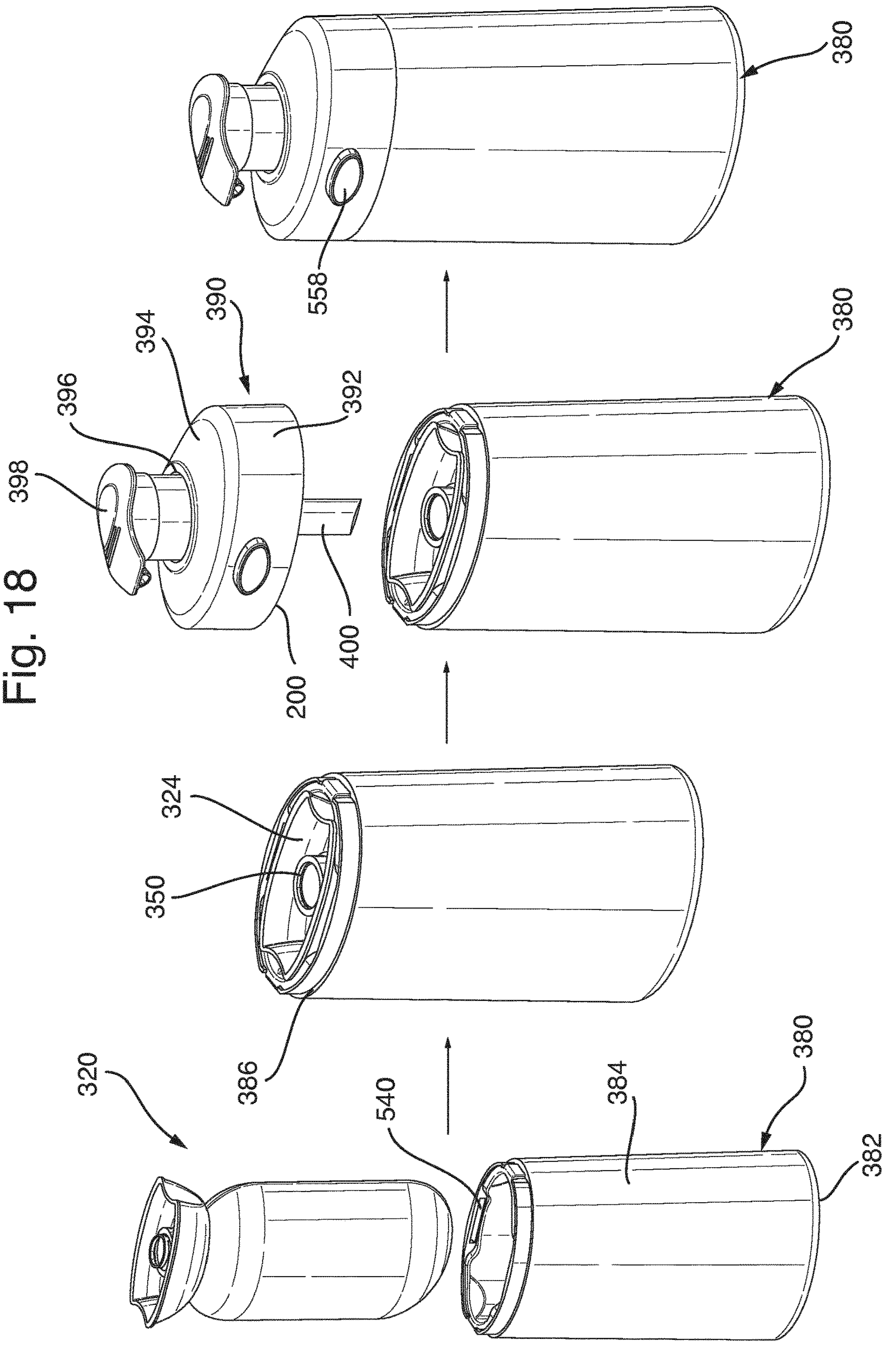

FIG. 18 is a perspective view of the alternative refill bottle and alternative outer rigid shell container at various stages of assembly.

Figure 19:
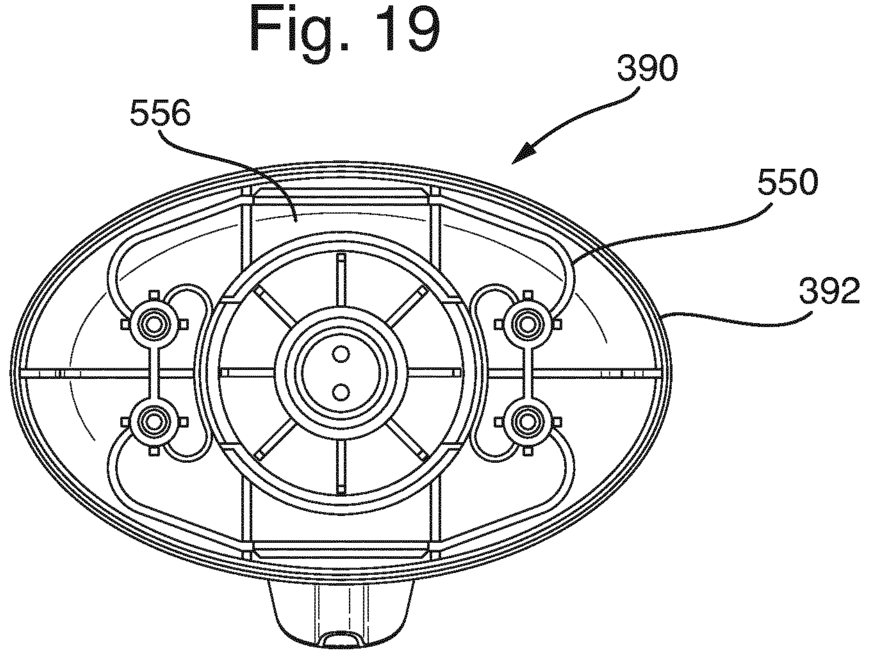

FIG. 19 is a bottom plan view of a closure for the alternative rigid outer shell package.

Figure 20:
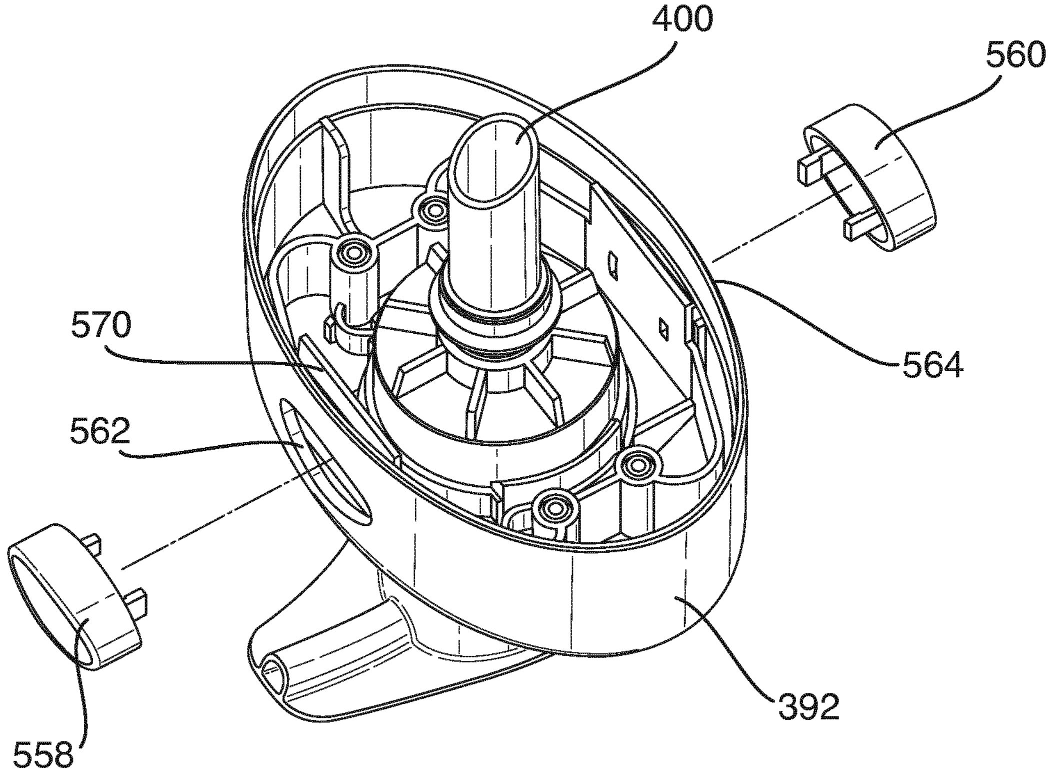

FIG. 20 is a bottom perspective view of a closure for the alternative rigid outer package with certain parts exploded.

Figure 21A:
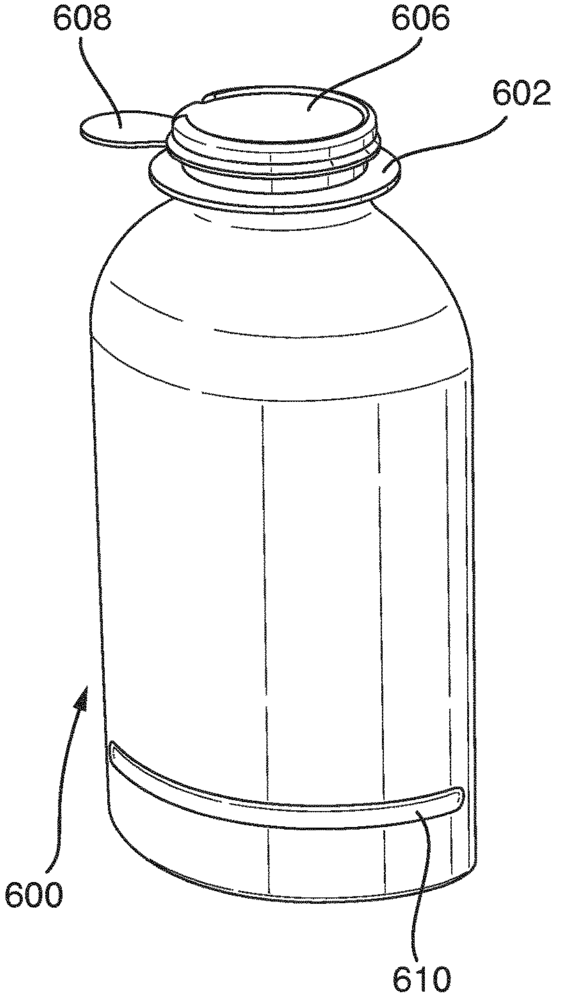

FIG. 21*a* is a perspective view of an alternative thin walled refill wherein an integral ledge replaces the fitment.

Figure 21B:
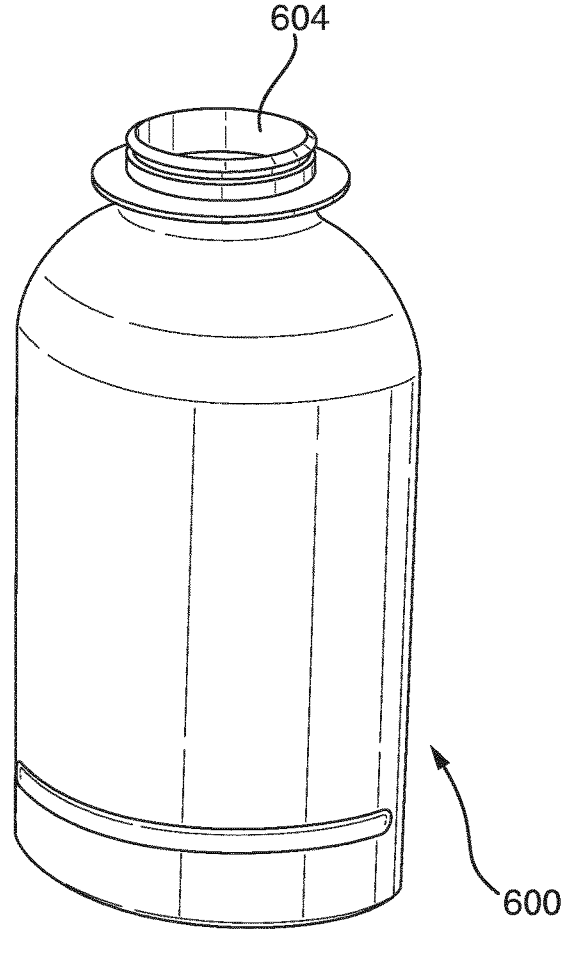

FIG. 21*b* is a perspective view of the alternative thin walled refill of FIG. 21*a*, with the cover removed.

Figure 22A:
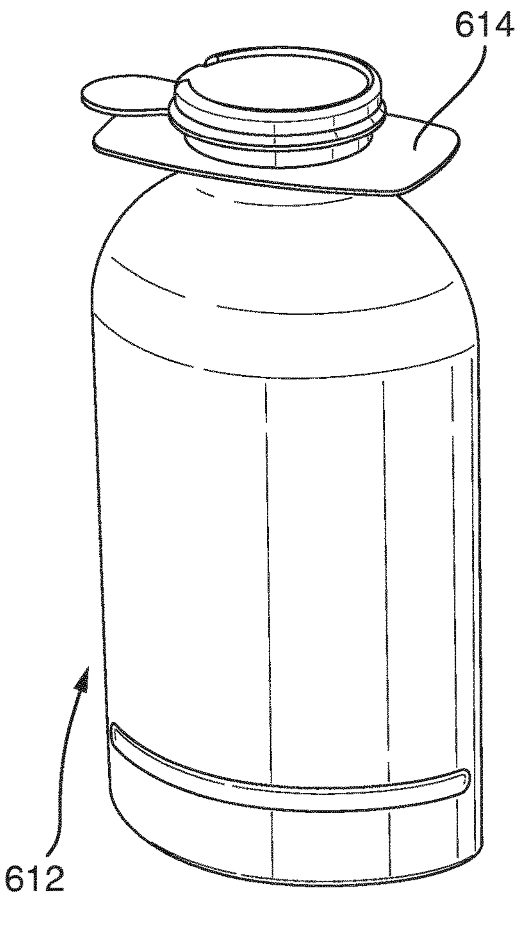

FIG. 22*a* is a perspective view of yet a further alternative thin walled refill wherein an integral ledge replaces the fitment.

Figure 22B:
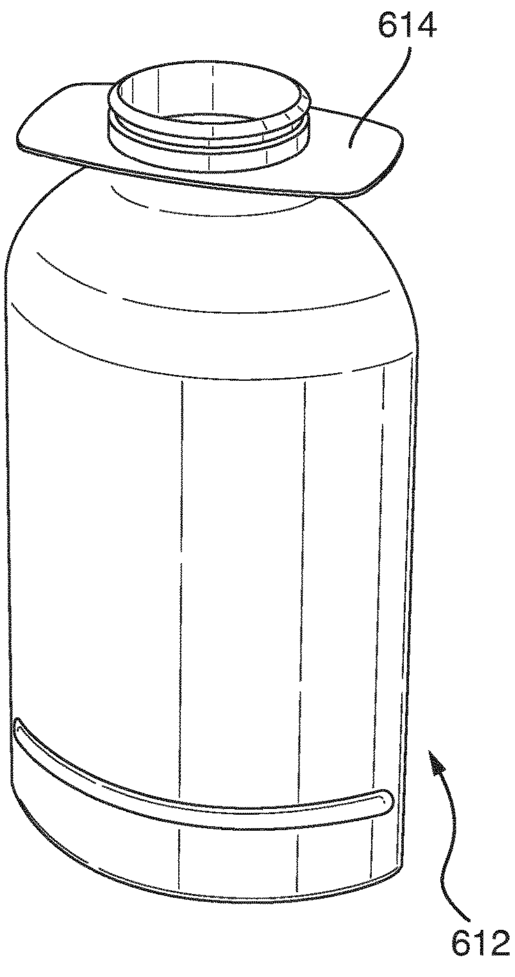

FIG. 22*b* is a perspective view of the further alternative thin walled refill of FIG. 22*a*, with the cover removed.

Figure 23A:
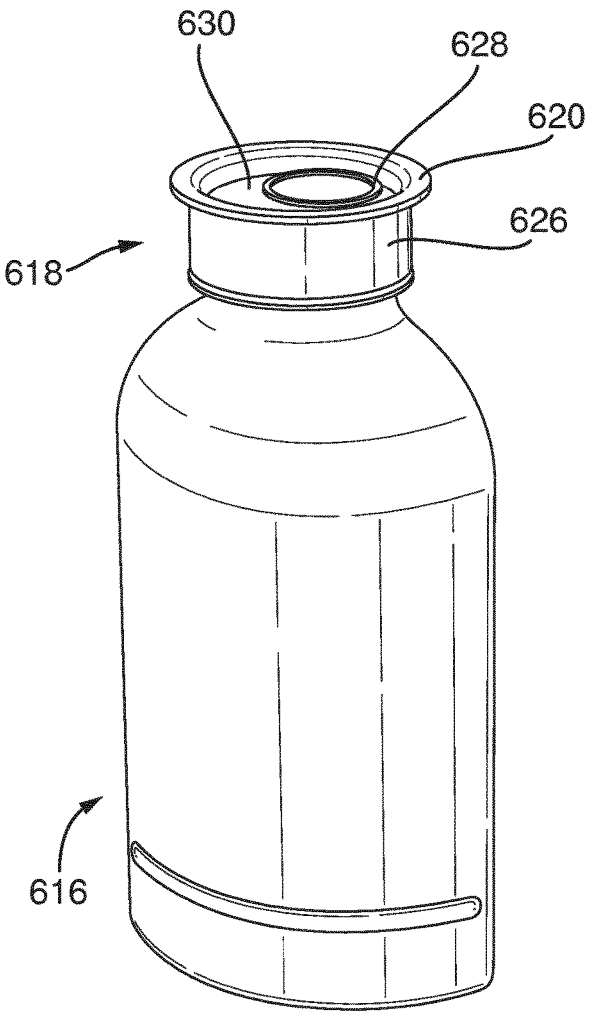

FIG. 23*a* is a perspective view of a still further alternative thin walled refill wherein an integral ledge replaces the fitment.

Figure 23B:
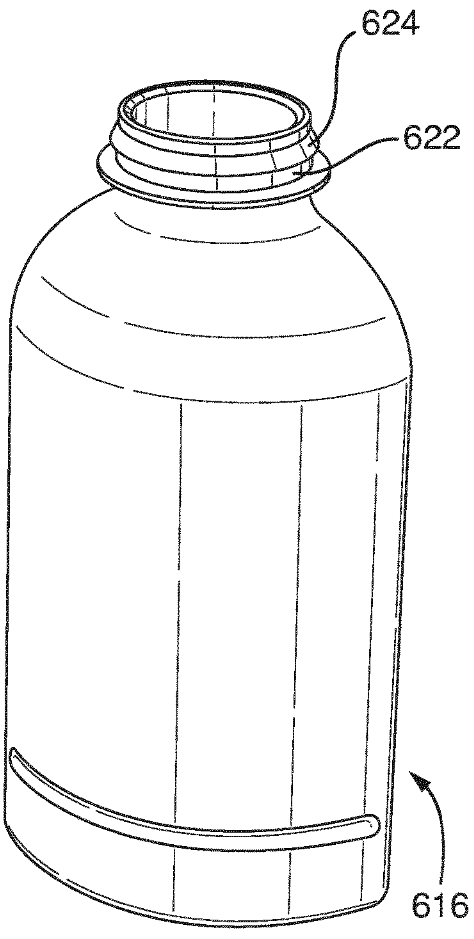

FIG. 23*b* is a perspective view of the further alternative thin walled refill of FIG. 23*a*, with the closure removed.

Figure 24:
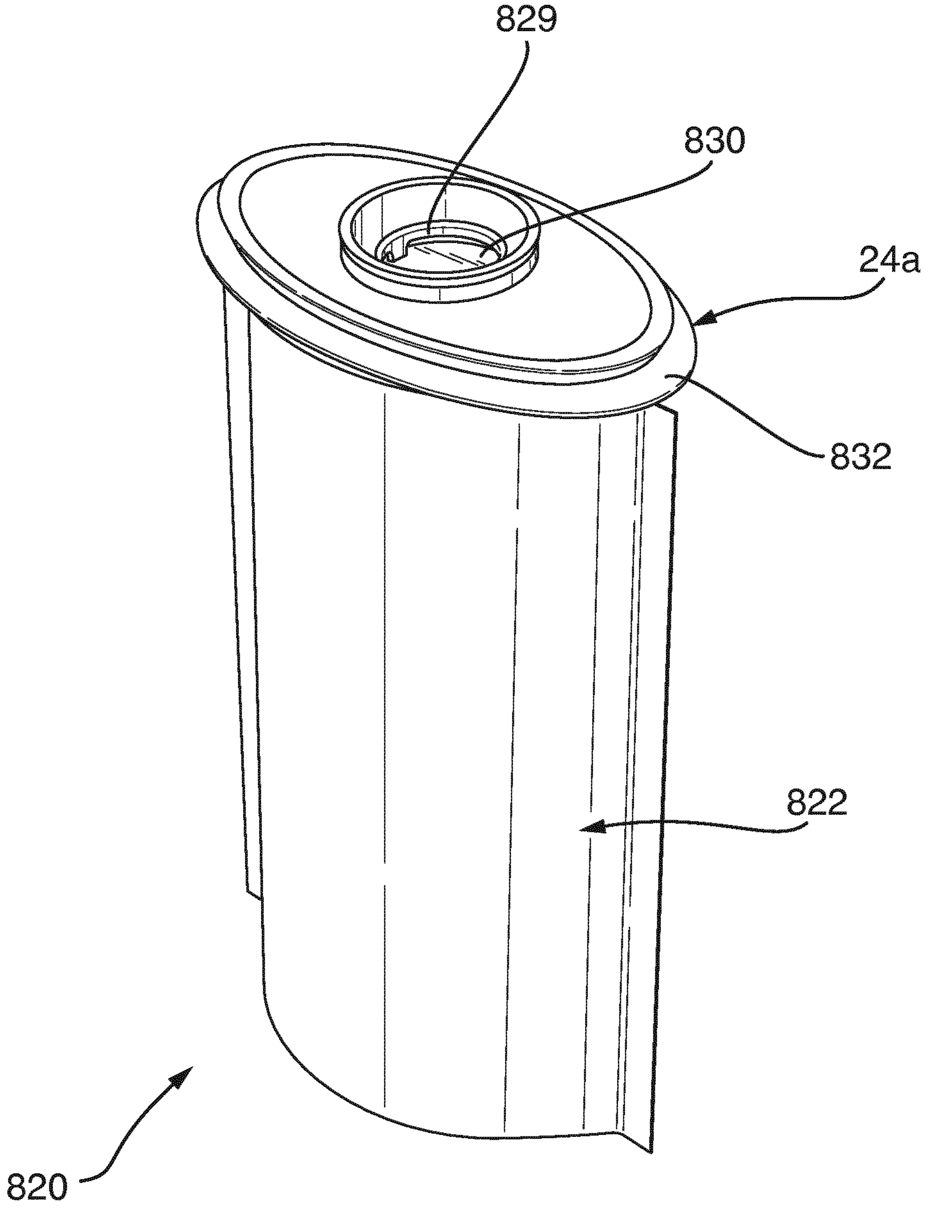

FIG. 24 is a perspective view of an alternative fitment and refill container according to the invention.

Figure 25:
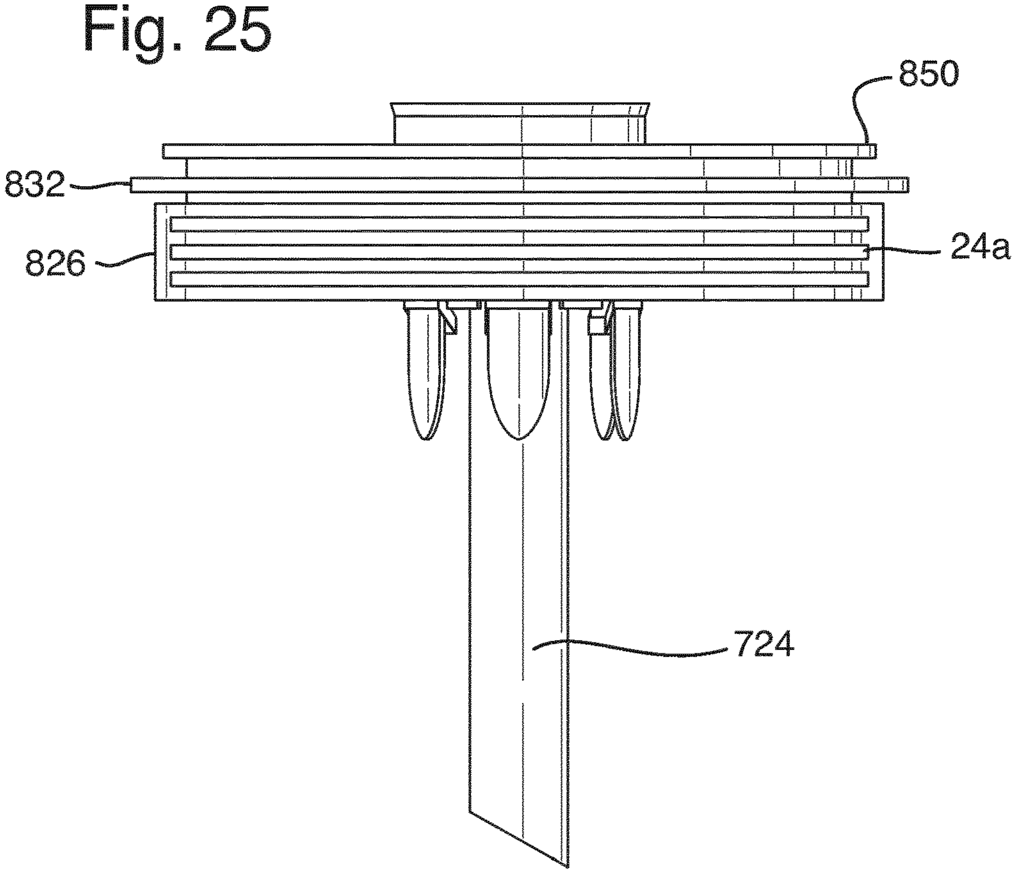

FIG. 25 is a side elevation view of the fitment of FIG. 24 together with a portion of the dip tube.

Figure 26:
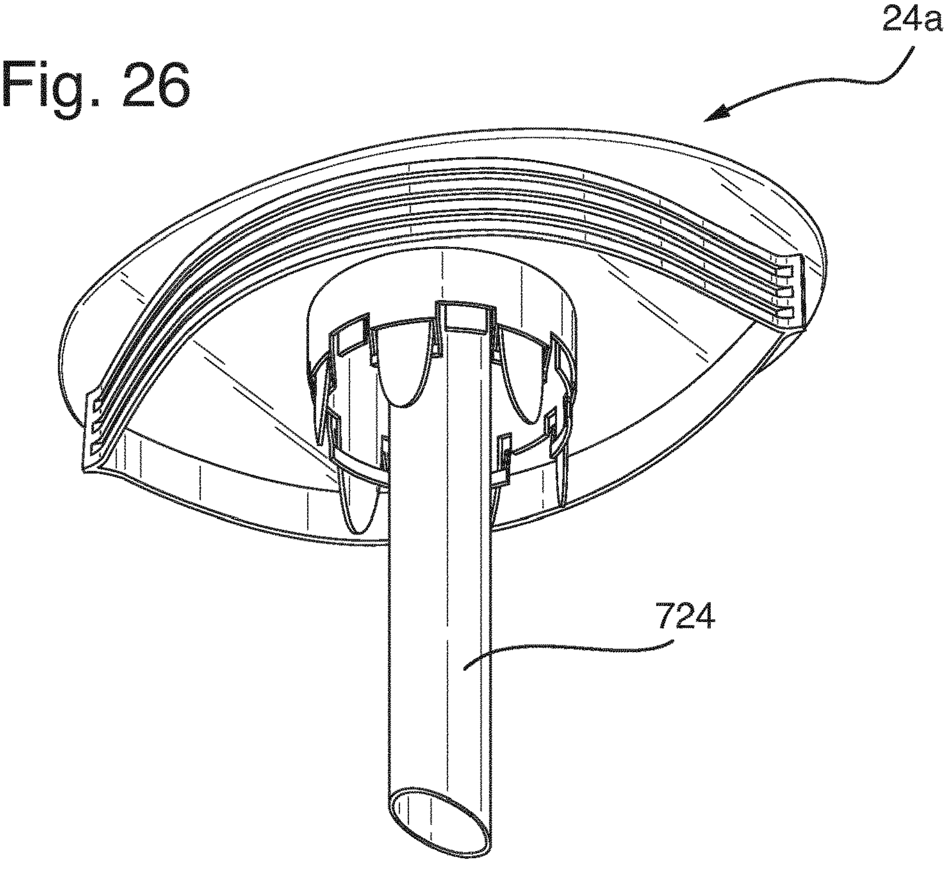

FIG. 26 is a bottom perspective view of the fitment plus dip tube of FIG. 25.

Figure 27:
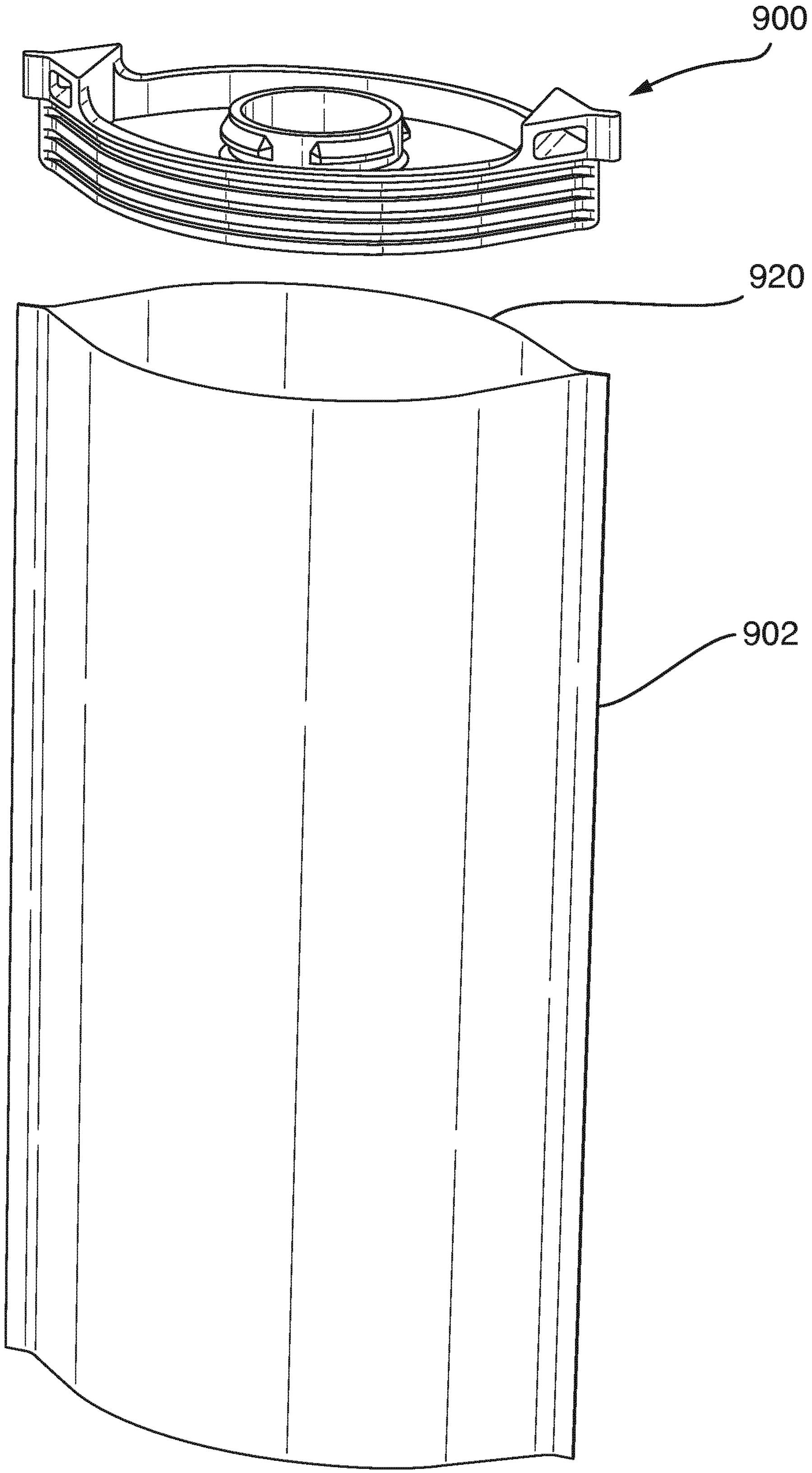

FIG. 27 is a perspective view of a further embodiment of the fitment, together with a product chamber.

Figure 28:
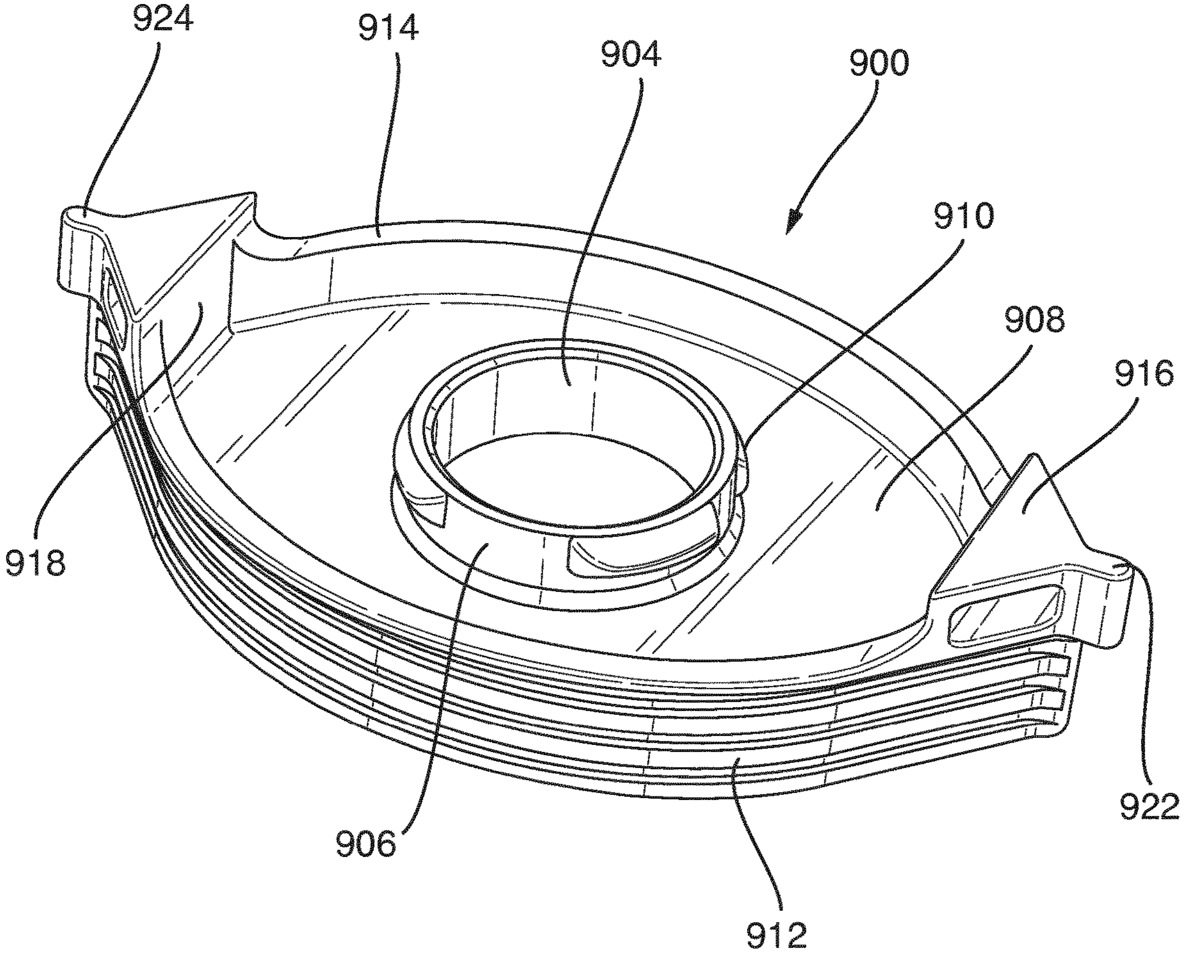

FIG. 28 is a perspective view from above of the alternative fitment.

Figure 29:
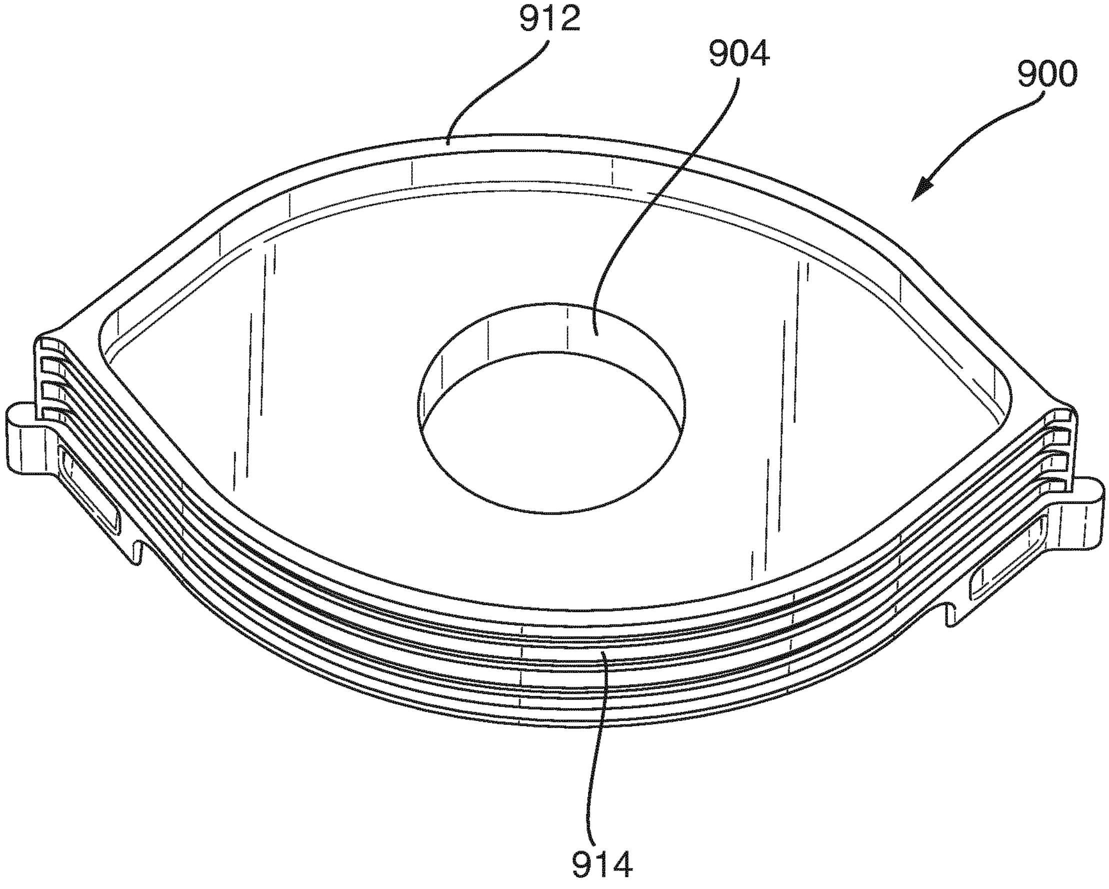

FIG. 29 is a perspective view from below of the alternative fitment.

Figure 30:
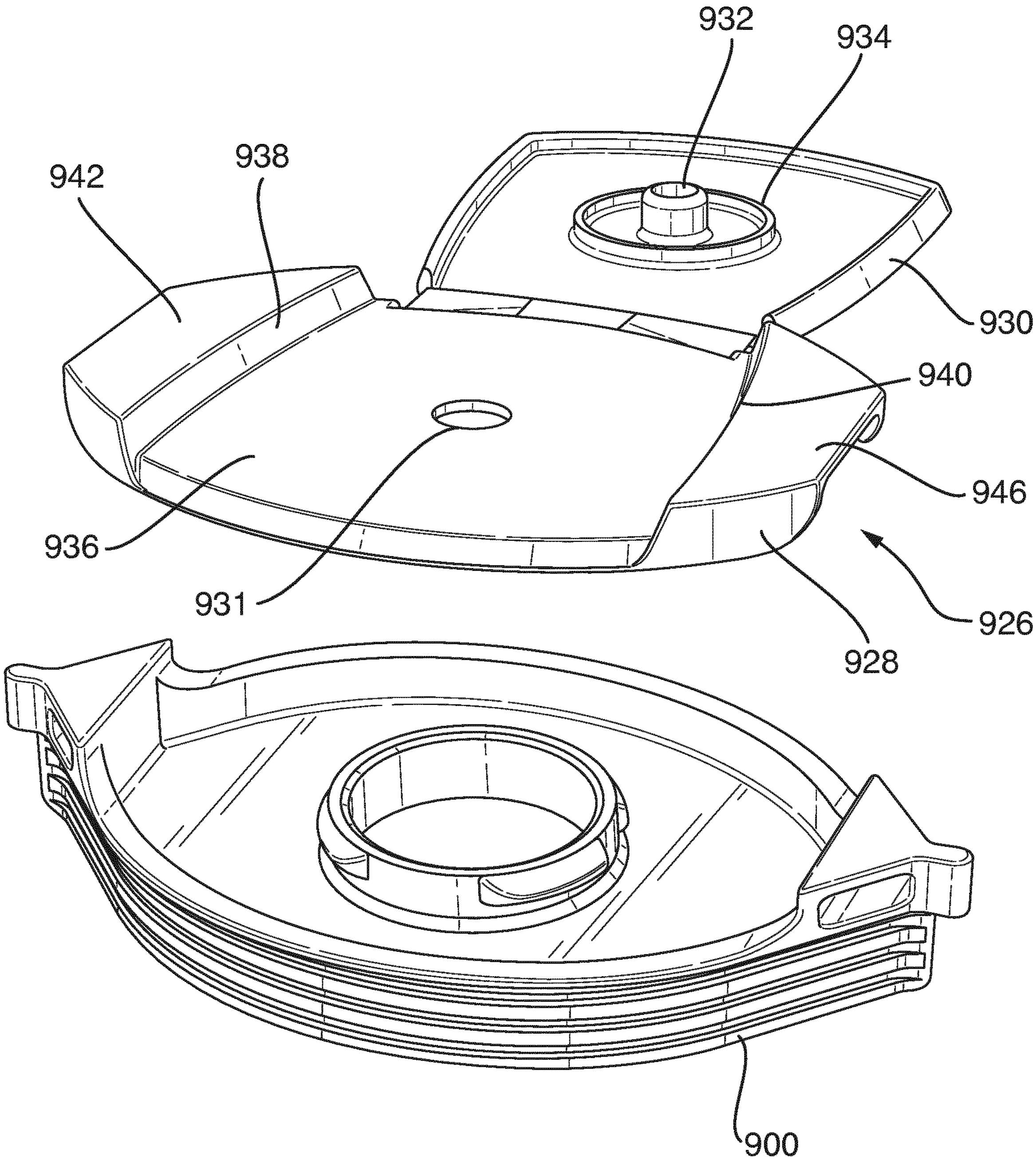

FIG. 30 is a perspective view of the alternative fitment with a closure attachment in position above it prior to snap fitting them together.

Figure 31:
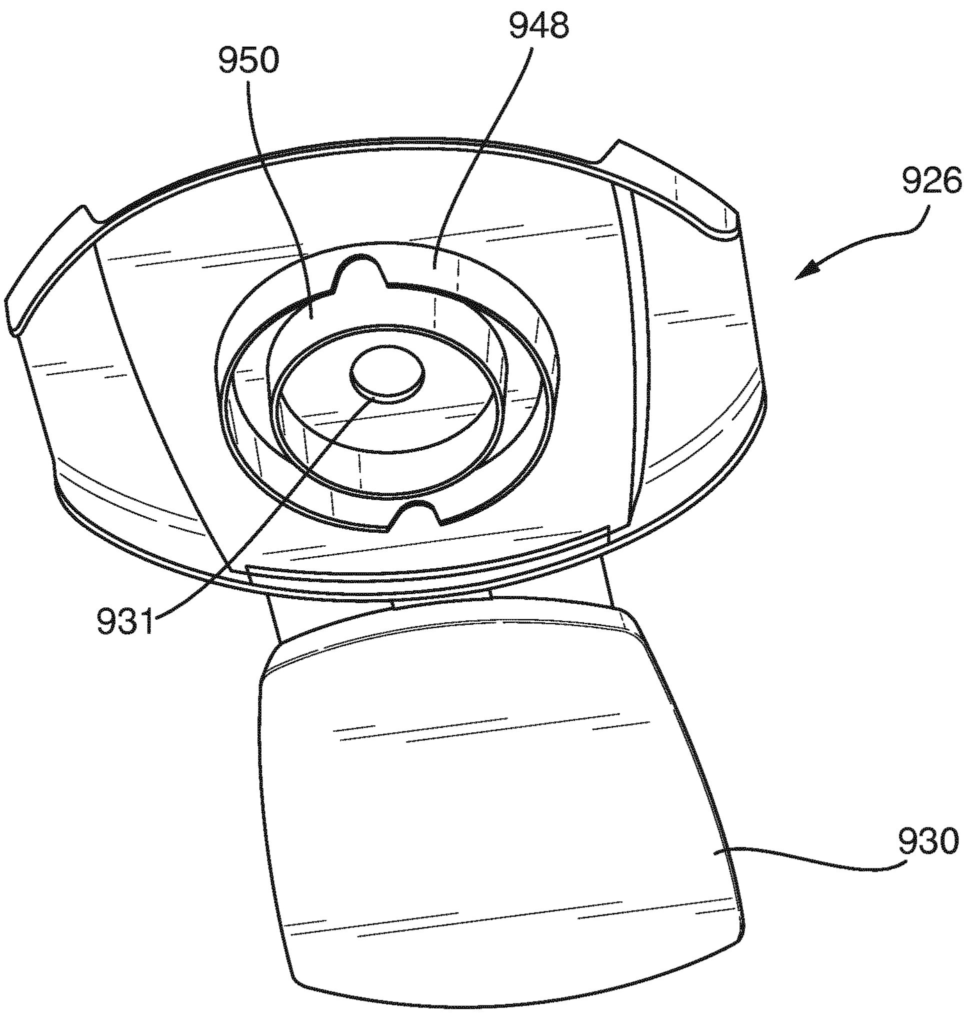

FIG. 31 is a bottom perspective view of the closure attachment of FIG. 30.

Figure 32:
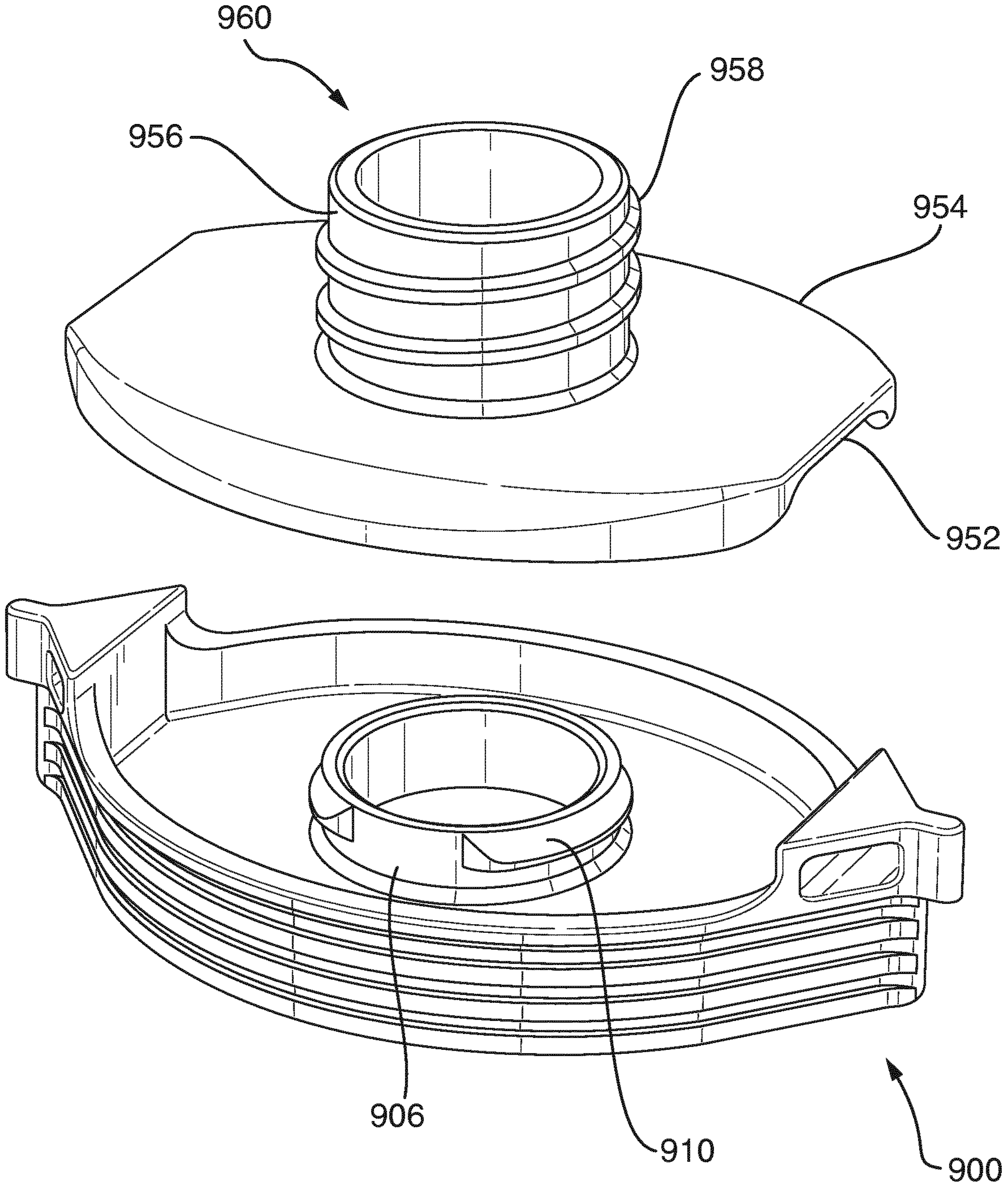

FIG. 32 is a perspective view of the alternative fitment with an alternative closure attachment in position above it prior to snap fitting them together.

Figure 33:
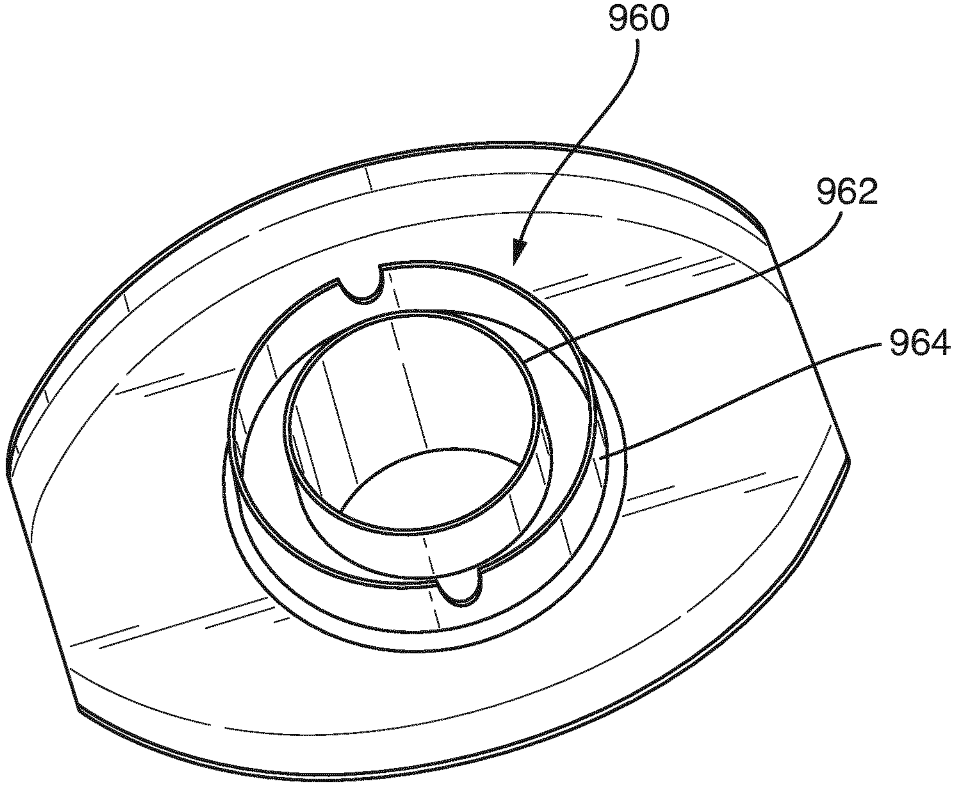

FIG. 33 is a perspective view from below of the alternative closure attachment of FIG. 32.

Figure 34:
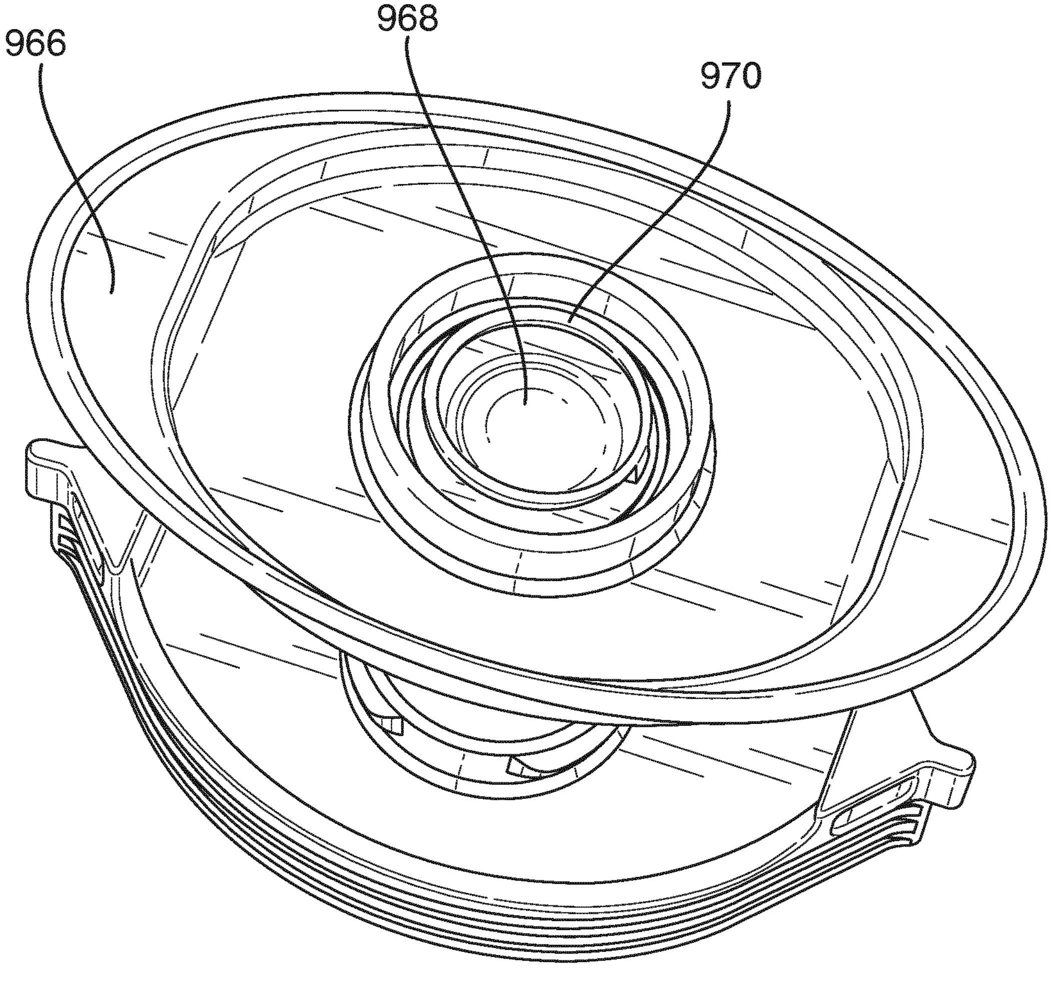

FIG. 34 is a perspective view from above of a still further alternative closure attachment showing a portion of the alternative fitment below.

Figure 35:
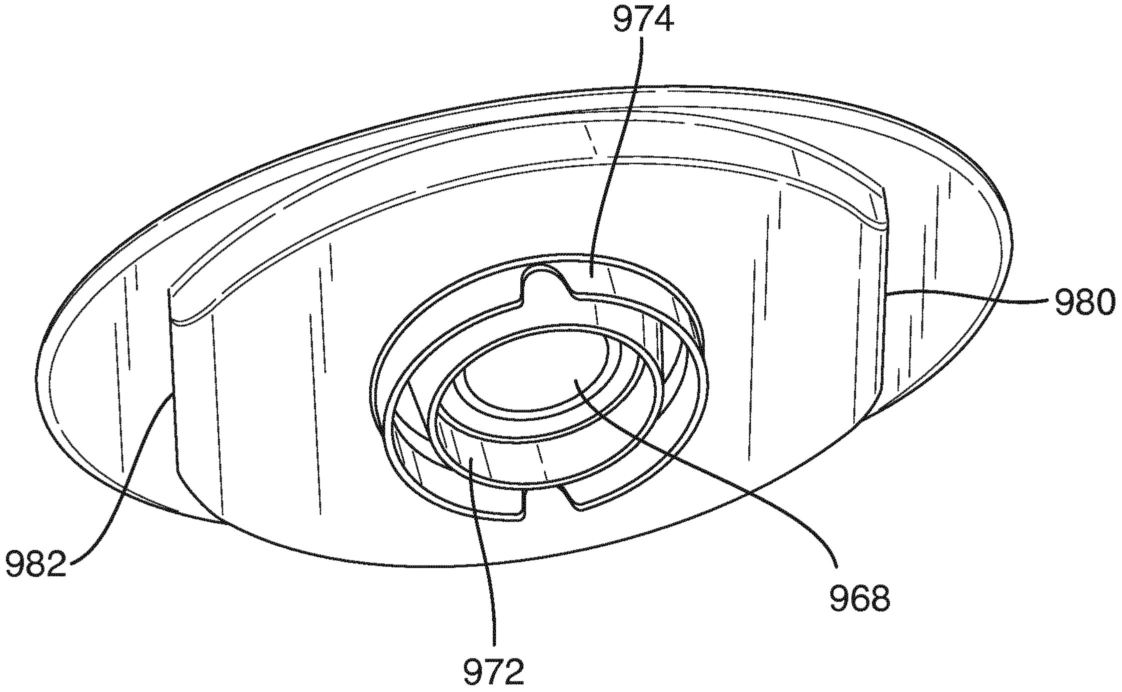

FIG. 35 is a perspective view from below of the still further alternative closure attachment.

Figure 36:
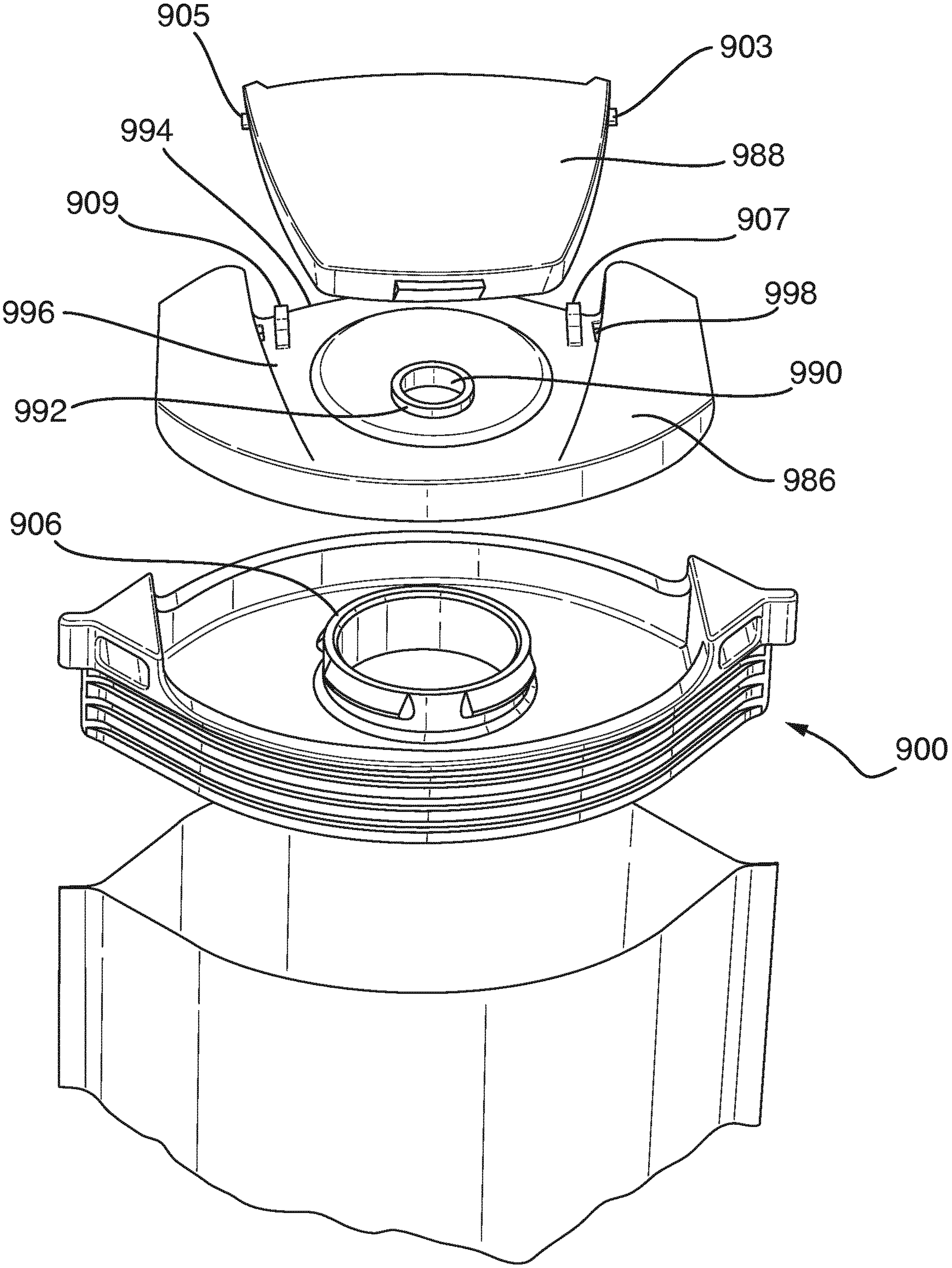

FIG. 36 is a perspective view from above of another alternative closure attachment in position for snap fitting above the alternative fitment.

Figure 37:
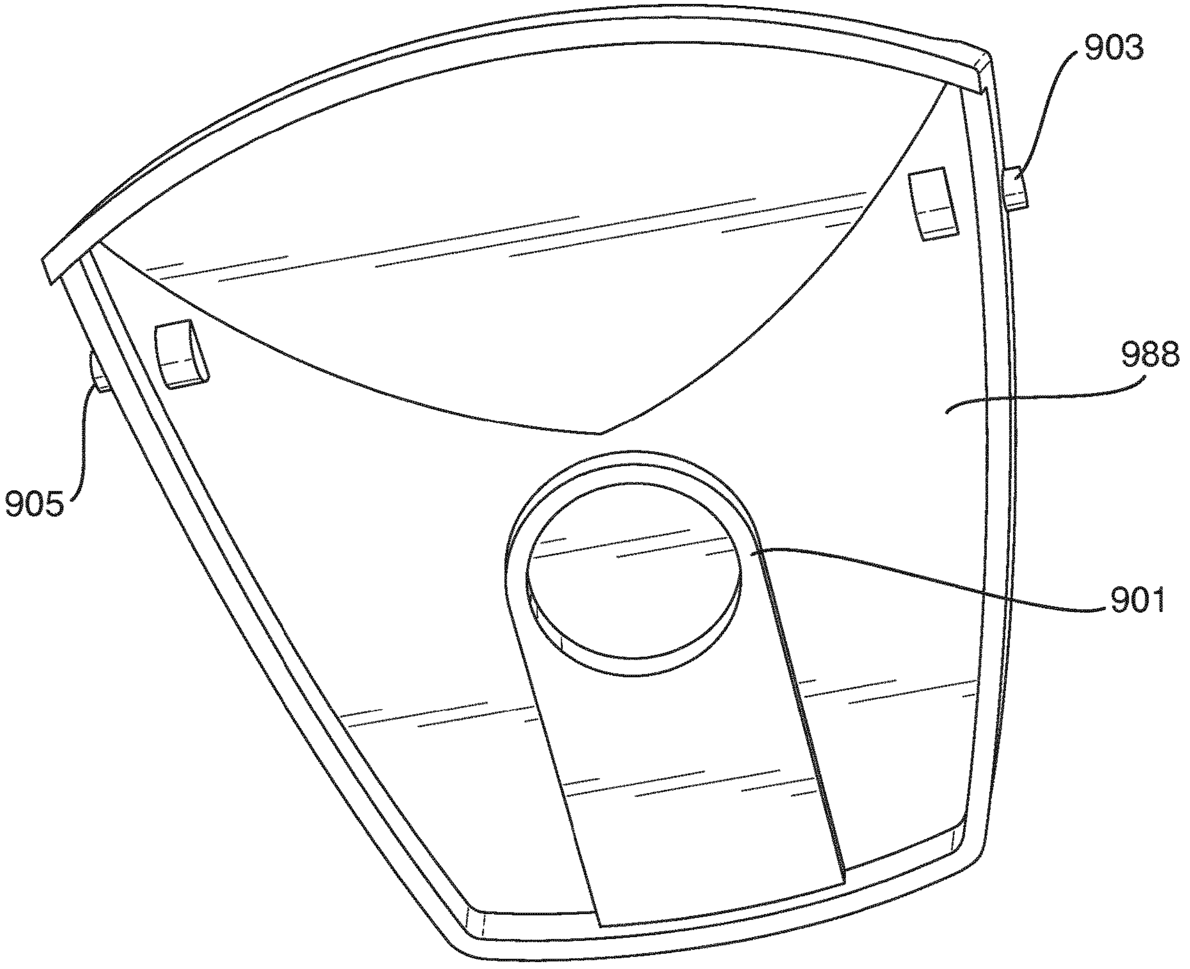

FIG. 37 is a perspective view from below of the cover of the attachment of FIG. 36.

Figure 38:
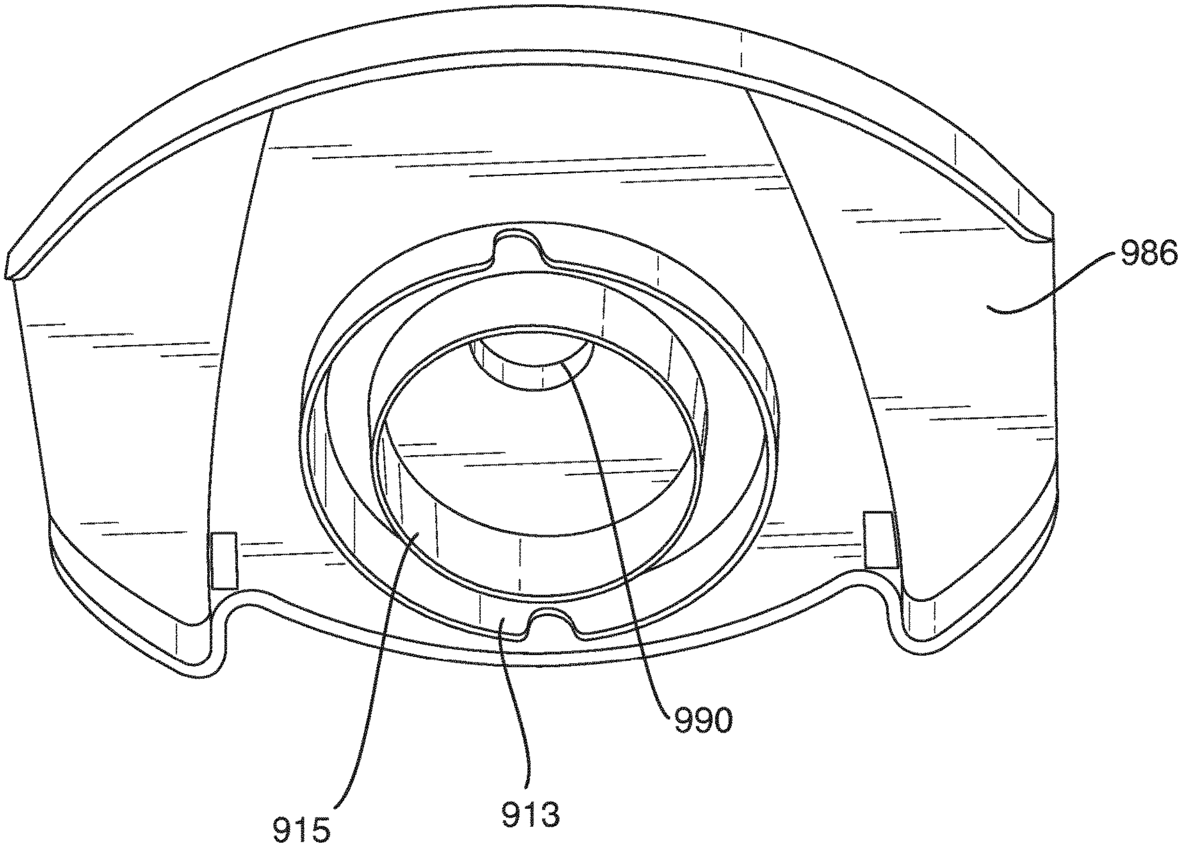

FIG. 38 is a perspective view from below of the base of the attachment of FIG. 36.

DETAILED DESCRIPTION OF THE INVENTION

Figure 1:
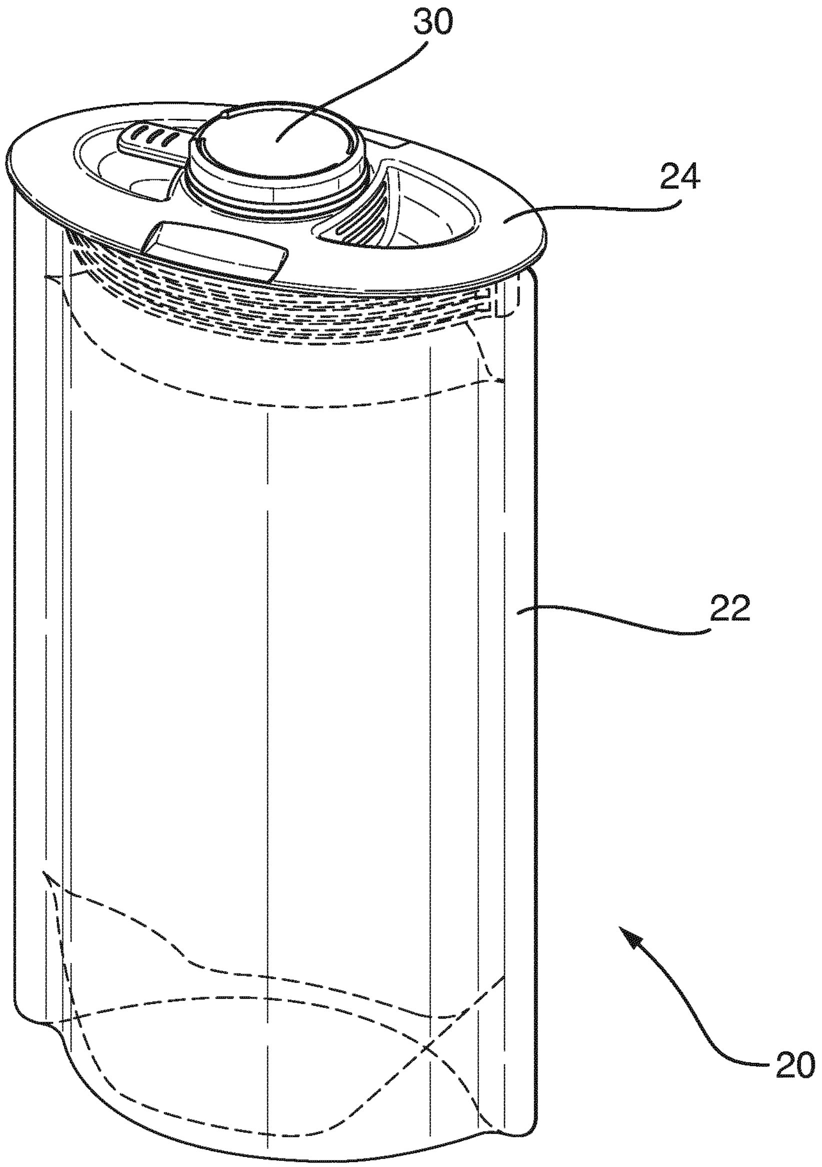
FIG. 1 is a perspective view of a product refill container of the invention.

Product refill container 20 (FIG. 1) includes product chamber 22 and discrete fitment 24 attached thereto as by heat seal. Chamber 22 is a flexible pouch such as a Doypack® pouch. Fitment 24 (FIG. 6*a*) comprises fitment base 26, optional one way valve 28 and pull tab 29 attached to destructive closure 30. Fitment base 26 also includes ledge 32.

Beneath closure 30 is opening 98. Opposed finger-receiving recesses, 64 and 66 are situated on opposite sides of opening 98.

Outer shell container 210 (FIG. 5) includes rigid product reservoir 34 and closure 70. Rigid product reservoir 34 (FIG. 2) is made of a rigid material capable of standing upright. Rigid product reservoir 34 extends axially upwardly and has an opening 200 (FIG. 2) at the top of the reservoir at one axial end thereof. The bottom end of the rigid reservoir is closed, except possibly for a drain hole, as mentioned above, in that the rigid reservoir comprises a base wall 270 covering the bottom end and sidewall 36 extending upwardly from the base wall to the uppermost edge 240 which defines a mouth 290 of the rigid reservoir. The drain hole, if present, may have a minimum diameter of 0.5 mm, preferably of 1 mm. The diameter of the drain hole is preferably not larger than 5 mm, especially not larger than 2.5 mm.

Reservoir 34 includes a refill supporting surface in the form of internal ledge 38 at least partly surrounding opening 200. The ledge need not completely surround the opening. Upper reservoir wall 52 extends upwardly from ledge 38 and terminates in uppermost edge 240. Upper wall 52 includes slot-shaped apertures 54 and 56.

The ledge 38 of the rigid product reservoir, upon which the fitment may rest, is preferably spaced at least 2 mm from the uppermost edge 240 of the rigid product reservoir. More preferably, the ledge is spaced at least 5 mm from the uppermost edge of the rigid product reservoir. Ideally the ledge is spaced no more than 10 mm from the uppermost edge of the rigid product reservoir.

Figure 4:
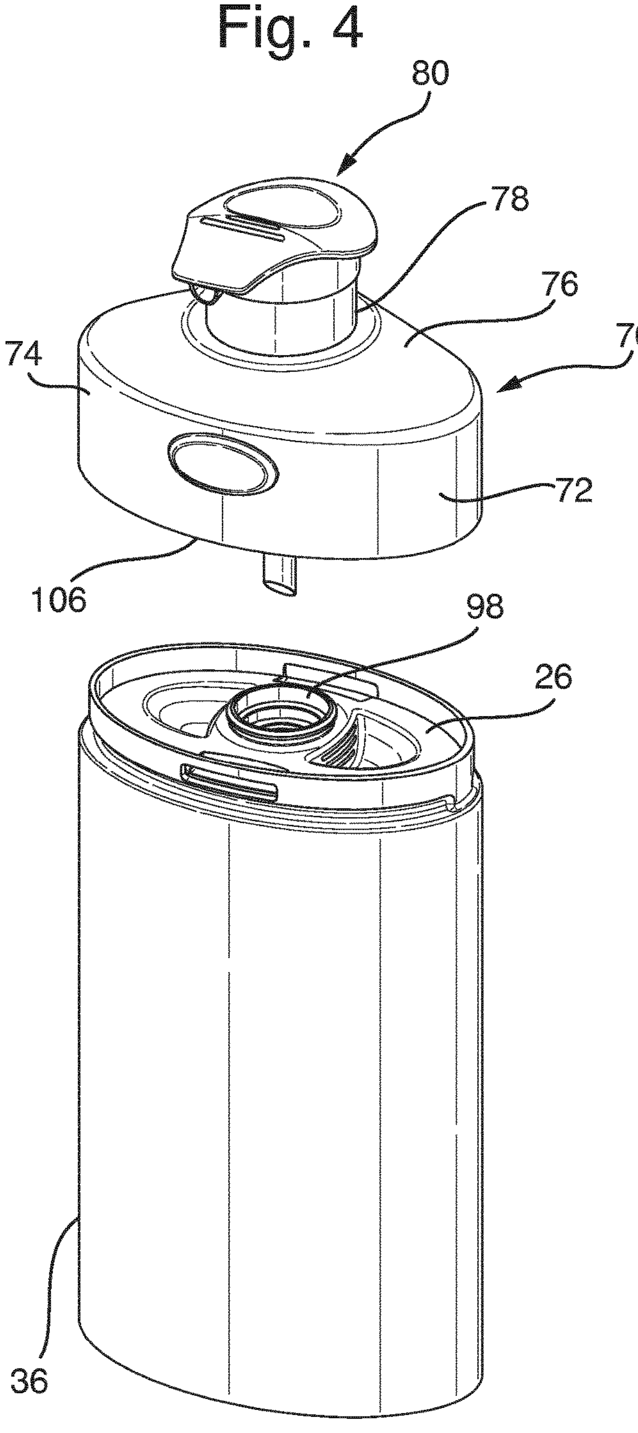
FIG. 4 is a perspective view of the combined refill container and rigid product reservoir with a closure prior to closing.
Figure 5:
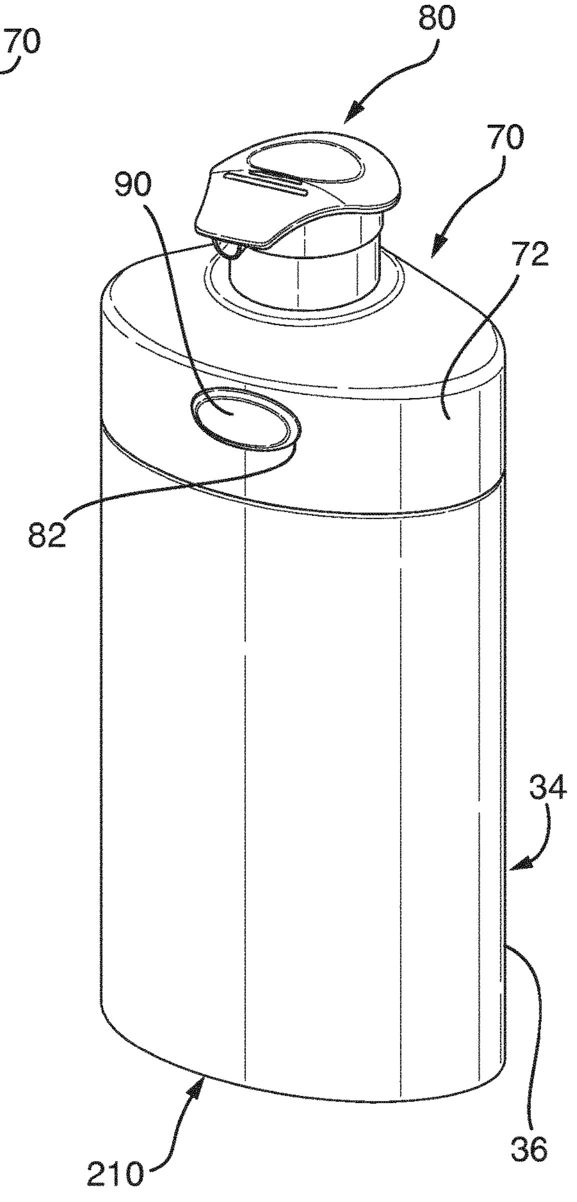
FIG. 5 is a perspective view of the outer shell container housing a discrete refill container of the invention comprising the rigid product reservoir and closure.

Closure 70 (FIG. 4), unconnected to the rigid product reservoir 34, can be snap fit axially and downwardly onto the rigid product reservoir to cover the opening 200 and complete outer shell container 210. Closure 70 comprises skirt 72 and shoulder 76 leading upwardly and inwardly therefrom to terminate in opening 78. Skirt 72 includes aperture 82, (FIGS. 5 and 7) which accommodates button 90 (FIG. 5).

As illustrated, the closure need not be connected to the rigid product reservoir but instead snaps on to it and can be completely removed, the removal sequence being initiated by operation of the button.

Spring 88 (FIGS. 7 and 9) is snugly received within the interior of skirt 72 and surrounds pump assembly 84. Spring 88 contains one or more protuberances 100 which are received within apertures 54, 56 of upper reservoir wall 52 (FIG. 2) when the closure rests on the rigid reservoir and the package is closed. Spring 88 urges button 90 through opening 82 when the package is closed. It is preferred that all gaskets and seals within the pump are air tight to facilitate use of an airless pump.

When the consumer wishes to insert a refill, she can press button 90 on closure 70 of package 210. Button 90 is connected to spring 88 which is connected to protuberances 100 in such a way that the protuberances are moved inwardly within the interior of the closure 70 and out of apertures 54, 56, when the button is pressed. This releases closure 70 so that it is free to be removed. Closure 70 is removed by lifting upwardly and axially.

Figure 2:
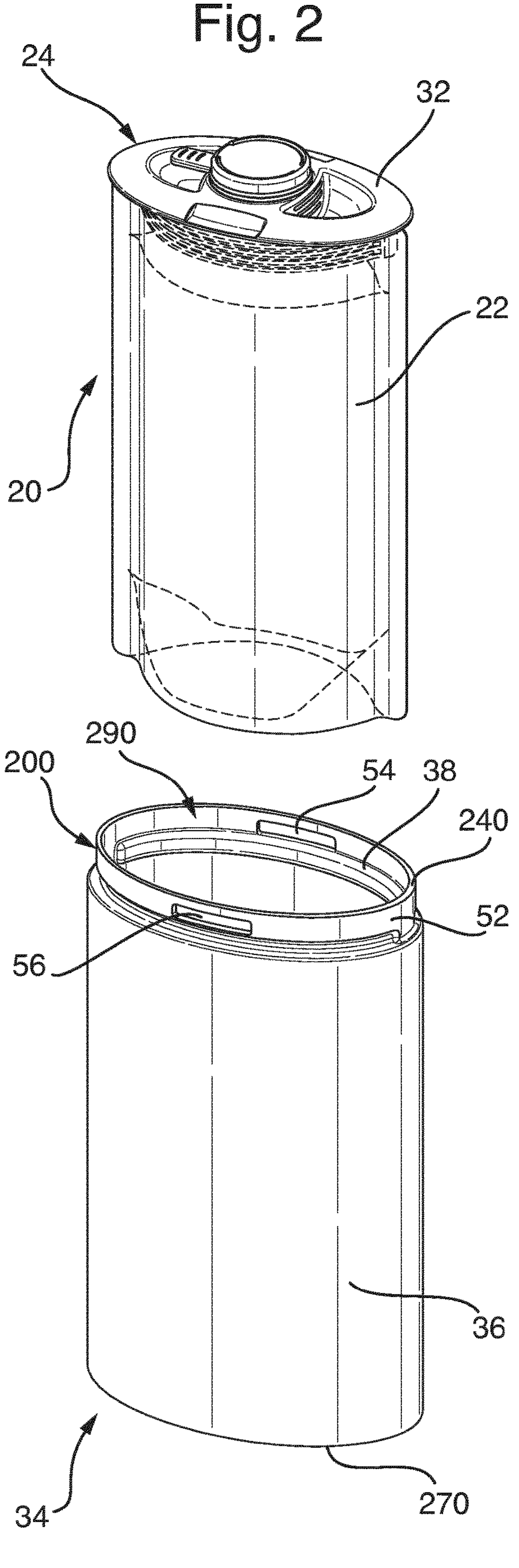
FIG. 2 is a perspective view showing the product refill container prior to insertion into a rigid product reservoir.
Figure 3:
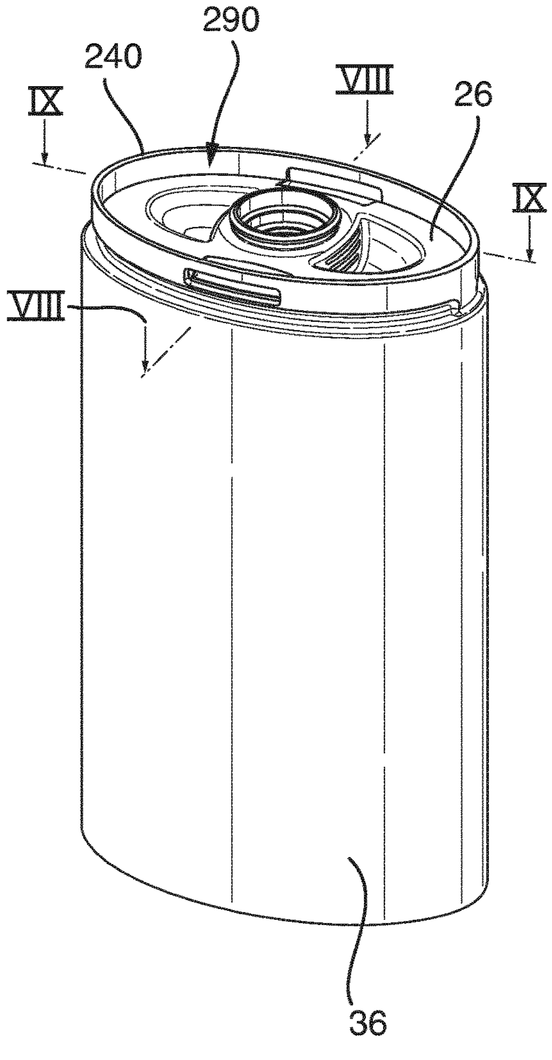
FIG. 3 is a perspective view of a combined refill container and rigid product reservoir.

Any existing refill in rigid package 34 is removed using finger recesses 64, 66. New refill 20 is then placed in rigid container 34, as seen in FIG. 2, also grasped, if desired, by the finger recesses. When it is placed in rigid reservoir 34, ledge 32 of fitment 24 rests upon ledge 38 of shell container 34. Thus although refill 20 comprises in large part flexible bag 22 (in addition to fitment 24), it is supported for actual use by rigid reservoir 34. Accordingly, the combined refill and outer shell container can readily stand upright on surfaces such as tables, basins, etc. in the home, notwithstanding that the refill is largely fabricated from a lightweight flexible pouch.

Given the similar oval cross sectional shapes of refill 20 and package 210, rotation of the refill relative to the reservoir will be negligible.

The consumer next grasps tab 29 to remove destructive covering 30 (FIG. 6*a*) and thereby open the refill. She then places closure 70 axially over combined rigid reservoir 34 and refill 24 and inserts dip tube 94 through opening 98 in the fitment. As she continues to place the closure 70 over the combined refill/outer rigid package, if desired she can press button 90 causing spring 88 to be urged inwardly to facilitate placement of the closure on the rigid reservoir unimpeded. Upon release of button 90, spring 88 urges protuberances 100 into apertures 54, 56 whereby the closure snaps locked onto the refill/rigid outer package. Alternatively, the closure can simply be pressed onto the rigid container to snap in place.

Dip tube 94 of airless pump 80 extends into refill 20 whereby the product is ready to be pumped through application of axial force by pressing on pump head 80.

In the closed position, bottom edge 106 of closure 70 rests upon lip 50 of outer rigid reservoir 34 (FIG. 11). Lip 50 can be molded into the rigid product reservoir as seen in FIG. 8.

When it is desired to remove the refill, the consumer again presses button 90, which urges protuberances 100 out of slots 54, 56 whereby to release the closure 70. Closure 70 can then be removed axially and upwardly from atop the rigid reservoir 34. Then, the consumer can grasp fitment 24 using opposed finger recesses 64, 66 and axially lift the refill from the reservoir. The refill can be discarded or recycled and the outer package can be used once again.

Because the refill can be made of lighter material and need not be rigid, it can be expected that less material would need to be recycled or reach a landfill, therefore resulting in less of an environmental impact. Moreover, the refill/outer package arrangement is very easy to use. The closure on the outer package has a clearly visible cue, button 90, suggesting how it is to be opened, the finger recesses provide an easy way to remove the fitment/flexible pouch, and the refill is merely gently dropped in and pulled out of the outer shell container. The outer shell closure does not require rotation by the consumer, e.g., to unscrew it.

The arrangement whereby an outer ledge of the fitment rests on an inner ledge on the interior of the rigid reservoir facilitates insertion and removal of the refill with respect to the reservoir. Use of the airless pump avoids the need for a cumbersome and long dip tube and better permits evacuation of all of the product from the refill. The pump mechanism is secured to the closure so that it is not necessary for the consumer to screw or unscrew the pump from the closure.

The refill product chamber may be a double gusset Doyen pack or other package. Preferably the refill product chamber is made of a flexible material which is capable of standing upright. Doy pack is available from Thimonnier of St German Au Mont D'Or, France. The fitment is preferably made of a plastic material such as polypropylene. The fitment is made by injection molding. The optional one way valve, if present, may be overmolded onto the fitment and the destructive, peel off cap is snapped on to cover the fitment mouth and seal the fitment. The fitment is welded to the doy pack flexible pouch.

The rigid product reservoir is preferably made of a plastic such as PET, PP, HDPE, or ABS.

The invention provides an easy to use environmentally friendly refill/outer package which can be expected to encourage use of refills by the consumer and minimization of solid waste. The finger recesses on the fitment permit ready removal of the fitment. The spring and button arrangement on the closure permit ready removal and insertion of the closure. The use of a flexible pouch in refill 20 permits use of less expensive and less wasteful packages.

The outer shell container of the invention may be provided in somewhat different shapes for sale as different brands all for use with one standard refill. Particularly where the shapes of the outer shell container are varied, if necessary to support refills a ring may be included within the opening of the rigid reservoir of the outer package. Alternatively, differently branded refills can be used with a single outer shell.

In contrast with the flexible film material of which the pouch is made, the rigid product reservoir is made of rigid molded plastic.

An alternative refill container is shown in FIGS. 24-26. Product refill container 820 includes product chamber 822 and discrete fitment 24*a* attached thereto as by heat seal. Chamber 822 is a flexible pouch such as a Doypack® pouch. Fitment 24*a* comprises fitment base 826, optional one way valve (not shown) and pull tab 829 attached to destructive closure 830. Fitment base 826 also includes ledge 832 which functions similarly to ledge 32 of FIGS. 2 and 6*a*.

Fitment 24*a* includes a rim 850 disposed above ledge 832. The rim may extend in an endless loop surrounding the central area of the fitment, as illustrated, or it may extend over only a portion of a loop surrounding the central area of the fitment. Rim 850 provides a surface for transfer equipment to grasp from below or the side to facilitate movement of the refill from one position to another during manufacture and packing. Preferably, the rim is disposed at least on two opposing sides of the fitment whereby to facilitate grasping by equipment for transfer of the refill from a first location to a second location.

Referring now to FIG. 15, alternative refill container 320 comprises lightweight bottle 322 and fitment 324. Bottle 322 may be made of low density polyethylene or other plastic material, preferably thin, lightweight plastic material. Alternative refill container 320 is suitable for display in an inverted position as show in FIG. 15. Bottle 322 may be made by extrusion or other suitable process. A preferred range of wall thicknesses for the bottle 322 is 0.01 mm-0.32 mm. More preferably, bottle 322 ranges from 0.01 mm-0.2 mm in thickness within the main bottle cavity and 0.2 mm-0.32 mm in thickness within the neck. Bottle 322 comprises front wall 328, rear wall 330 and neck 332 (FIG. 12) which terminates in opening 334 to reveal mouth 336. Neck 332 includes rectangular protuberances 344, 346 on opposite sides thereof.

Fitment 324 is made of polypropylene or other suitable plastic.

Fitment 324 includes a centrally disposed, medial neck or tube 350 surrounded by fitment wall 352 which terminates in fitment ledge 354. Fitment wall 352 comprises front wall 458, rear wall 360 and first and second side walls 362 and 364. Walls 362 and 364 extend inwardly in a concave manner for reasons which will be explained hereinafter. The walls meet at four corners 410, 420, 430 and 440, each of which extends upwardly and outwardly from a bottom wall to the ledge 354. The upwardly and outwardly extending corners afford a surface on which the fitment can be supported either in the mouth of the rigid package or on a refill support ring. The ledge 354 is at the same or a higher level than the cover and the opening of neck or tube 350 since the ledge supports the fitment and the bottle when the bottle rests on the fitment.

Fitment neck 350 is shaped to accommodate bottle neck 332 and to permit the fitment to be secured onto the bottleneck. The fitment may be permanently secured to the bottleneck or releasably secured, as desired.

Pull ring 370 is provided for opening destructive cover 390.

The inner side 372 of the fitment neck includes recesses which will accommodate protuberances 344, 346 when the fitment is placed on the neck of the refill bottle. The fitment may be snapped on to the neck of the refill.

As mentioned above, fitment 324 stably supports refill bottle 322 (FIG. 15) and can be used for product display or for storage in the home, if so desired.

Consumer use of the refill, may be with rigid outer package 380 (FIG. 16) which is a modified version of rigid outer reservoir 34. Outer package 380 comprises oval generally flat bottom wall 382, oval sidewall 384, peripheral closure support edge 386 and recessed upper wall 388. Package 380 is also provided with closure 390 (FIG. 18) which includes depending skirt 392, shoulder 394 and opening 396 which accommodates airless pump 398 having dip tube 400.

If the desired shapes of rigid package 380 and fitment 324 afford a less-than-optimal fit of the fitment within the bottle 380, and particularly where a rigid outer package like 380 lacks an internal support ledge, refill support ring 520 may be utilized (FIG. 16). Refill support 520 includes flanges 522 and 524 which receive recessed aspects 526 and 528 of rigid package wall 388 when the refill support is placed within mouth 130 of the package. Refill support 520 is generally tubular or ring-shaped with an oval shape to match the oval shape of package 380. The top wall of refill support 520 includes recess 710 so as not to obstruct aperture 140 present in top wall 388 of container 380.

Closure 390 (FIGS. 19 and 20) is very similar to closure 70 described above. It includes spring 550 wedged, or otherwise snugly received, within the inner wall of skirt 392. Spring 550 is attached to buttons 558, 560 and to a protuberance adapted to fit within aperture 140 of the rigid package. Spring 550 urges buttons 558 and 560 outwardly through apertures 562, 564 in skirt 392. Centrally disposed within spring 550 is pumping mechanism 556.

Once initial product is substantially depleted, in order to prevent having to purchase and use a new rigid package/closure, the consumer purchases a refill. Generally, when sold, refill container 320 will be closed, i.e., by destructive cover 390, which the consumer needs to remove using the pull ring 370. When refill support 520 is placed in mouth 130 of rigid package 380, the package is ready to receive refill 320. Refill 320 is inverted from the display position shown in FIG. 15 to that shown in FIG. 18. Refill 320 can then be gently dropped into package 380 before or after removal of the destructive cover. Fitment 324 is received within and held by refill support 520. Refill support 520 can be omitted if the size and shape of the mouth of the rigid package and of the fitment are such that the package mouth will support the fitment without the refill support, particularly if the rigid outer container has an inner supporting surface such as ledge or rim 38 described above.

As seen in FIG. 17, fitment 324 is supported at four points by refill support ring 520. As illustrated, the fitment is configured so as to have at least three, preferably each of its four corners, slant upwardly and outwardly whereby the inclined wall affords a location for the fitment to rest on, and be supported by, the fitment support. However, alternative shapes are possible so long as the fitment is able stably to rest, directly or indirectly, in the mouth of the rigid package 380. Fitment 324 can rest directly in the mouth of package 380 or, as illustrated, indirectly, such as by resting on support 520. If desired, one or more ledges or protuberances may extend inwardly from mouth 130 of package 380 and/or from fitment support 520 to support the fitment. Likewise, if desired one or more ledges or proturberances may extend outwardly from fitment 324 to assist in supporting it in mouth 130.

The shape of the mouth of package 380 is illustrated as oval, but various shapes, including rectangular, circular or something in between are possible.

When it is desired to place closure 390 on container package 380, dip tube 400 is inserted through opening 350 of fitment 324. The consumer places closure 390 axially over combined rigid reservoir 380 and refill 320. As she continues to place the closure 390 over the combined refill/outer rigid package, she may press button 558, causing spring 550 to be urged inwardly to ensure that the closure can be placed on the rigid reservoir unimpeded. Upon release of button 558, spring 550 urges one or more protuberances into one or more apertures 140 on the rigid container 380 whereby the closure snaps locked onto the refill/rigid outer package, similar to closing of outer shell container 210.

Accordingly, when closure 390 is placed on package 380, it snaps closed by virtue of the action of spring 550 and its protuberance which is received within aperture 140. Closure bottom edge 200 rests on closure support ledge 386. Dip tube 400 of the airless pump extends into refill 320 whereby the product is ready to be pumped through application of axial force by pressing on pump head 398.

In contrast to the ultra thin blow molded bottle refill, the rigid product reservoir is made of rigid molded plastic. The fitment may be snapped on to the neck of the refill.

The fitment may be permanently secured to the refill. The refill bottle may be made of a lightweight plastic material, thereby conserving plastic and minimizing waste materials. In particular, use of the refill avoids the need for constantly using and discarding a stronger, more bulky material, e.g., the rigid material of which the outer package is made, since the outer package is re-used.

The refill bottles and outer package of the invention are easy to use in that the bottle is simply dropped into the outer package and the closure 390 pushed down to snap fit. The closure is readily released by again depressing the buttons 558, 560 and then removing the cover from the bottom section of the rigid outer package. The consumer can remove the refill by grasping the concave portions 362, 364 of refill bottle fitment 324.

The fitment and rigid support are preferably made of plastic such as polypropylene. The fitment and rigid support are preferably made by injection molding.

The rigid product package is preferably made of a plastic such as PET, PP, HDPE or ABS.

An airless pump, such as an AVDS pump available from Rieke Packaging Systems of Auburn, Indiana may be used in any of the embodiments of the invention.

FIGS. 21*a*, 21*b*, 22*a*, 22*b*, 23*a* and 23*b* show alternative thin-walled plastic refill bottles wherein the fitment has been replaced by an integral ledge which can be supported by a supporting surface, rim or ledge on the rigid outer container, e.g., 210.

Thin walled plastic refill bottle 600 is similar to bottle 322 of FIG. 15, except that it includes ledge 602 surrounding mouth 604. Bottle 600 is closed by destructive cover 606 which can be removed with pull tab 608. Bottle 600 includes recess 610 in at least one of its side walls and extending approximately 180 degrees around the circumference of the bottle spaced from, but proximate, its bottom end. The purpose of the recess is to provide guidance for bottle collapse during use. The bottle should "fold" along the recess to provide a neater and more complete collapse yielding higher % evacuation. Thin walled, plastic refill bottle 612 (FIGS. 22*a* and 22*b*) is similar except that ledge 614 is shaped differently from that of bottle 600.

Thin walled plastic bottle 616 (FIGS. 23*a* and 23*b*) are similar to bottles 600 and 612 except that bottle 616 includes snap on closure 618 having ledge 620. Neck 622 of bottle 616 includes snap ring 624 which mates with one or more snap beads (not shown) on closure 626. Pull tab 628 can be used to remove cover 630 on closure 626.

For each of bottles 600, 612 and 616, the ledge is shaped to permit it to be supported by structure associated with the mouth of a rigid outer container, such as those shown in the previous embodiments. For instance, the bottle ledges may be supported by top walls of the mouths of the container, by an inner ledge in the rigid container mouth, by a refill support insert such as 520, or the like. Moreover, a further advantage is that the ledge may serve a dual purpose in that it may also be useful in transporting the bottle during manufacture. That is, equipment used to transfer the bottle from one location to another may grasp the ledge e.g. ledge 602, 614 and 620.

As seen in FIG. 27, alternative fitment 900 is shown in position above product chamber 902 prior to inserting the fitment onto the top of the chamber. Fitment 900 is similar to fitment 24 discussed above. Fitment 900 is adapted to combination with various attachments providing different closure options to form a modular fitment. By using a modular fitment, it is possible to be more flexible in the type of closure which is used. Product chamber 902 will be the same as, or similar to, product chamber 22.

As seen in FIG. 28, fitment 900 includes centrally disposed cylindrical opening 904, although other shapes can be used as desired. Opening 904 is defined by cylindrical wall 906. As illustrated in FIGS. 28 and 29 wall 906 extends above and below fitment platform 908. Fitment 900 may include on fitment wall 906 one or more protuberances 910 to assist in friction fitting of fitment 900 with fitment attachments.

In addition to centrally disposed wall 906, fitment 900 includes front and rear walls 912, 914 on the periphery of the platform 908. As illustrated, front walls 912 and 914 together form a generally oval shape, although other shapes can be used as desired. Fitment 900 includes also on the periphery of platform 908 sidewalls 916 and 918. Sidewalls 916 and 918 are shown as rectilinear, although other shapes may be used as desired.

The peripheral walls of fitment 900 (912, 914, 916, 918), like the central cylindrical wall 906, extend both above and below fitment platform 908.

Fitment 900 includes protuberances 922 and 924, which extend outwardly beyond the fitment peripheral wall. Protuberances 922 and 924 rest on upper edge 920 of chamber 902 when the fitment is accommodated in place partly within the chamber. Other possible arrangements whereby the fitment is supported by the upper edge of the chamber will be apparent to one of ordinary skill.

Use of modular fitment 900 permits use of a variety of closures with the same fitment. For instance, as seen in FIG. 30, closure 926 is a flip top closure. Flip top closure 926 includes base 928 and cover 930 hingedly connected thereto. Base 928 includes opening 931 which accommodates cylindrical plug 932 when cover 930 is in the closed position. Sealing ring 934 surrounds cylindrical plug 932 to further seal the opening when the cover is the closed position. Base 928 includes base platform 936 and base walls 938, 940. Cover 930 rests on base platform 936 and within base walls 938 and 940 when the cover is in the closed position. Flip top closure 926 also includes peripheral wings 942 and 946.

As seen in FIG. 31, on the underside of the base 928, inner ring 950 surrounds opening 931 and outer ring 948 surrounds inner ring 950. Inner ring 950 and outer ring 948 are spaced so as to accommodate cylindrical wall 906 of fitment 900 there between when base 928 is affixed to fitment 900. The upper side of wall 906 is snugly accommodated between outer ring 948 and inner ring 950 of the underside of closure 926 when base 926 and fitment 900 are snap fit together.

In FIG. 32, fitment 900 is shown with an alternative closure attachment 952. Closure attachment 952 includes platform 954 and cylindrical bottle neck 956, which includes threads 958 on the outside. Cylindrical neck 958 defines opening 960. The underside of attachment 952 as seen in FIG. 33 includes opening 960 surrounded by inner ring 962. Inner ring 962 is spaced from and surrounded by outer ring 964, leaving room to accommodate wall 906 of fitment 900. Preferably, attachment 952 can be snap fit onto fitment 900 by fitting cylindrical wall 906, optionally with one or more protuberance 910, to create a comfortable friction fit. Attachment 952 provides an option to use a bottle neck with a screw-on cap (cap not shown).

A further type of attachment is the attachment 966 shown in FIG. 34 with a destructive closure 968 and pull tab 970. Pulling on tab 970 opens closure 968. As seen in FIG. 35, on the underside of attachment 966, destructive cover 968 (or the opening created when the cover is removed) is surrounded by inner ring 972, which is spaced from and surrounded by outer ring 974. Fitment wall 906 can be accommodated between the rings to snap fit attachment 966 onto fitment 900. Rectilinear walls 980 and 982 on the underside of attachment 966 are disposed adjacent to and within rectilinear walls 916 and 918 when the attachment is snap fit onto fitment 900. Attachment 966, therefore, provides a means for using the same fitment 900 with a destructive closure and pulltab.

FIG. 36 shows a two piece flip top closure in position to be snap fit onto fitment 900. Attachment base 986 includes centrally disposed opening 990 formed in platform 994 and defined by cylindrical wall 992. Base 986 includes two bearings 907, 909 positioned to receive ears 903, 905 on detachable cover 988. As the cover is moved between its open and closed positions, the ears rotate in the bearings. In the closed position, cover 988 sits on platform 994 within walls 996 and 998 of base 986.

The underside of cover 988 (FIG. 37) includes sealing ring 901.

As seen particularly in FIG. 38, underside of attachment 986 includes inner ring 915 surrounding opening 990. Inner ring 915 is surrounded by outer ring 913, leaving a space between inner ring 915 and outer ring 913 to accommodate in a snug fit wall 906 of fitment 900.

Thus, fitment 900 is structured to mate with various possible attachments to permit the use of a variety of different closures for the refill pouch.

As illustrated, fitment 900 does not include a ledge which would extend outwardly to rest on a supporting surface on an inner wall of the rigid product reservoir of a shell container. Therefore, in the embodiment illustrated in FIGS. 27-38, the pouch is intended to be the primary package, i.e. the package in which the product is initially sold and to be self-supporting when filled with product. That is, the shell can be omitted.

The packages of the invention can be used to contain a personal washing composition, e.g., a body wash or liquid soap, a skin care composition such as a skin moisturizing or other lotion or a shampoo, but will also be suitable for many different types of personal care and other compositions, as will be apparent to one of ordinary skill in the art.

The invention includes the following numbered aspects:

1. A shell container suitable for housing a discrete refill container, the shell container comprising:
   a rigid product reservoir extending axially and having an opening at one axial end and a recess in a side wall thereof and a closure unconnected to the rigid product reservoir when the closure is open and which releasably snaps axially onto the rigid product reservoir to cover the opening, the closure having associated therewith a protuberance which is accommodated within the recess on the rigid product reservoir when the closure releasably snaps closed, the shell container further comprising a supporting surface for supporting a ledge of the refill container, the recess being between the supporting surface and an uppermost edge of the package
2. The shell container according to claim 1 further including a spring associated with the closure, which spring urges the protuberance into the recess when the closure is snap fit on the reservoir and a button associated with the spring which can be pressed to urge the protuberance out of the recess whereby to release the closure and open the shell container.
3. The shell container according to claim 1 wherein the rigid product reservoir includes an uppermost edge and the supporting surface is spaced at least 2 mm from the uppermost edge.
4. The shell container according to claim 5 wherein the supporting surface is spaced at least 5 mm from the uppermost edge.
5. The shell container according to claim 1 wherein the closure includes a pump associated therewith.
6. The shell container according to claim 1 wherein the rigid reservoir includes a base wall covering an entire bottom end of the reservoir, the bottom end of the reservoir being closed, except for an optional drain hole, and side walls extending upwardly from the base wall, the side walls extending upwardly to the uppermost edge of the reservoir.
7. A product refill container comprising
   a product chamber and
   a fitment attached thereto and having a ledge suitable for resting on a supporting surface on an inner wall of a rigid product reservoir of a shell container when the product chamber of the refill is contained within the rigid product reservoir, the fitment including a destructive opening.
8. The refill container according to claim 7 wherein the product chamber comprises a flexible pouch.
9. The refill container according to claim 7 wherein the fitment further comprises a first finger recess.
10. The refill container according to claim 9 wherein the fitment further comprises a second finger recess and the first and second finger recesses are on opposite sides of the destructive opening.
11. The refill container according to claim 9 wherein the product reservoir has an inner circumference and the ledge of the fitment extends radially beyond the inner circumference of the product chamber.
12. A shell container suitable for housing a discrete refill container comprising: a rigid product reservoir extending axially and having an opening at a first axial end, a ledge at the first axial end for supporting a fitment ledge when a product chamber of the refill container is contained within the rigid product reservoir of the shell container, the shell container further comprising a closure, the closure not including locking threads engaged by circumferential movement of the closure.
13. The shell container according to claim 12 further comprising a protuberance associated directly or indirectly with one of the reservoir or the closure and a recess on the other of said closure or reservoir suitable for accommodating the protuberance when the closure is snap fit on the reservoir.
14. The shell container according to claim 13 further including a spring associated with the closure which urges the protuberance into the recess when the closure is snap fit on the reservoir and a button which urges the protrusion out of the recess whereby to release the closure and permit opening of the package.
15. The shell container according to claim 12 wherein the ledge for supporting the ledge of the refill container is interior to the shell container.
16. A package comprising a combined outer shell container and discrete refill container accommodated therein wherein the outer shell container includes a rigid product reservoir having a side wall and a closure which releasably snaps onto the rigid product reservoir, the product reservoir further including a ledge on a side wall, the refill container further including a fitment attached thereto having a fitment ledge, the fitment ledge resting on the outer shell container ledge.
17. The combined outer shell container and discrete refill container of claim 16 wherein the fitment includes a destructive cover.
18. The combined outer shell container and discrete refill container of claim 16 wherein the fitment comprises a first finger recess.

19. The combined outer shell container and discrete refill container of 18 wherein the fitment further comprises a second finger recess and the first and second finger recesses are on opposite sides of the destructive cover.
20. The combined outer shell container and discrete refill container of claim 16 wherein the outer shell container includes a mouth surrounding directly or indirectly the ledge, the mouth having a larger circumference than that of the fitment whereby the fitment can be disposed within the mouth resting on the ledge.
21. A combined outer shell container and discrete refill container wherein the outer shell container includes a rigid product reservoir and a closure, the refill container including a flexible pouch and a fitment attached thereto, the closure including an airless pump associated therewith which extends through the fitment into the flexible pouch when the package is closed.
22. A refill container having a fitment with a resting surface adapted to be used with a variety of outer package shells having a support surface on which the fitment resting surface can be supported whereby the same refill can be utilized for different brands or product concepts.
23. The package according to claim 1 wherein the recess is an aperture.
24. A refill container comprising a thin walled bottle and a fitment at one end thereof, the fitment being structured to stably support the bottle when it rests on the fitment, one of the bottle or fitment having a destructive cover, the combined bottle and fitment not being reclosable after opening of the destructive cover to reveal an opening in the fitment, the fitment and/or bottle having structures suitable for resting the fitment directly or indirectly within the mouth of a rigid outer container.
25. The refill container according to claim 24 wherein the bottle has a wall thickness of from 0.01 mm to 0.32 mm.
26. The refill container according to claim 24 wherein the bottle is made of low density polyethylene, or high density polyethylene or polypropylene.
27. The refill container according to claim 24 combined with a rigid outer shell container to form a package, wherein the refill container is at least partly accommodated within the outer container and at least three corners of the fitment rest directly or indirectly within the mouth of the outer container.
28. The package according to claim 27 wherein the rigid product reservoir extends axially upwardly and has an opening at one axial upper end and a closure which releasably snaps axially onto the rigid product reservoir.
29. The package according to claim 28 comprising a protuberance associated directly or indirectly with one of the reservoir or the closure and a recess associated with the other of said reservoir or said closure and suitable for accommodating the protuberance when the closure is snap fit onto the reservoir.
30. The package according to claim 29 further including a spring associated with the closure, which spring urges the protuberance into the recess when the closure is snap fit on the reservoir and a button which urges the protuberance out of the recess whereby to release the closure and open the package.
31. The refill container according to claim 24 wherein said fitment includes a ledge upon which the fitment rests when it supports the container, the surface being in a plane spaced from a plane extending through the opening.
32. A fitment comprising a bottom wall, a medial tube extending upwardly from the bottom wall, a front wall extending upwardly from the bottom wall, a rear wall extending upwardly from the bottom wall on a side opposite the front wall, a first side wall extending upwardly from the bottom wall, a second side wall extending upwardly from the bottom wall on an opposite side from the first side wall, the medial tube being disposed between the front and rear walls and between the first and second side walls, the medial tube terminating in a destructive cover, each of said front and rear walls and first and second side walls terminating in a support ledge suitable for supporting the fitment and an attached bottle, the front and rear wall and first and second side wall ledges being above the level of the destructive cover, at least three of the front and rear walls and first and second side walls forming at least three corners at their intersections, the at least three corners extending outwardly and upwardly from the bottom wall to intersections of the front, rear, first and/or second side wall ledges whereby to afford at least three surfaces on which the fitment can be supported in a rigid container mouth or a refill support disposed in a rigid container mouth.
33. The fitment according to claim 32 attached the neck of a thin walled bottle in combination with a rigid shell container to form a package wherein the at least three corners rest on a refill support ledge within the mouth of the rigid shell container.
34. The package according to claim 33 wherein the fitment has at least upwardly and outwardly inclined walls suitable for resting directly or indirectly within the mouth of the rigid outer package.
35. A thin walled bottle comprising a neck and a support ledge at least partly surrounding, directly or indirectly, the neck.
36. The bottle according to claim 35 wherein said bottle is combined with a rigid outer shell container and said bottle ledge rests on a supporting surface within or on a mouth of the container.
37. The shell container according to claim 1 wherein the supporting surface is a ledge interior to the container.
38. The shell container of claim 12 wherein the ledge is interior to the container.
39. The product refill container according to claim 7 wherein the fitment further comprises a rim disposed above the ledge.
40. The product refill container according to claim 39 rim is disposed at least on two opposing sides of the fitment whereby to facilitate grasping by equipment for transfer of the refill from a first location to a second location.
41. The product refill container according to claim 40 wherein the rim surrounds a central opening or closure of the fitment.
42. A product refill container comprising
a product chamber and
a fitment attached thereto and having a ledge suitable for resting on a supporting surface on an inner wall of a rigid product reservoir of a shell container when the product chamber of the refill is contained within the rigid product reservoir, the refill further comprising a rim disposed above the ledge.
43. A fitment comprising
a) a fitment platform, b) One or more outer walls extending upwardly from the fitment platform and defining the periphery of at least 40% of the circumference of the platform, c) An opening in the platform, d) A wall extending upwardly from the platform around at least 40% of the circumference of the opening, e) One or more protuberances extending outwardly beyond one or more of the outer walls of the fitment.

44. The fitment according to claim 43 wherein the one or more outer walls comprise at least two opposed curved walls and two opposed rectilinear walls 45. The fitment according to claim 44 wherein the curved walls together form a generally oval shape.

46. The fitment according to claim 43 in combination with a product chamber wherein the product chamber comprises side walls terminating in an upper edge, the one or more fitment protuberances comprising at least two protuberances, the at least two protuberances resting on the upper edge of the product chamber.

47. An attachment for a fitment comprising a) a platform, b) one of i) an opening or ii) a removable cover, disposed within the platform, c) an inner ring extending downwardly from the platform and encircling at least 40% of the circumference of the opening or cover, d) an outer ring spaced from the inner ring and encircling at least 40% of the circumference of the inner ring, e) the attachment being suitable for being fit onto a fitment.

48. The attachment according to claim 47 comprising the opening disposed within the platform and a bottle neck having threads extending upwardly from the platform and surrounding the opening.

49. The attachment according to claim 47 wherein the platform has the opening and further comprising a cover attached to the platform, the cover having an open position wherein the opening is open and a closed position wherein the opening is closed by the cover.

50. The attachment according to claim 49 wherein the cover includes a plug which fits sealingly within the opening when the cover is in the closed position.

51. The attachment according to claim 47 wherein the platform comprises the destructive opening.

52. The attachment according to claim 51 wherein the destructive opening includes a pull tab.

53. The attachment according to claim 47 further comprising a non-attached cover comprising two ears, the platform at least two bearings, the ears of the non-attached cover being received within the bearings whereby the cover can open and close when the ears rotate within the bearings.

54. A fitment in combination with an attachment, the fitment comprising f) a fitment platform, g) One or more outer walls extending upwardly from the fitment platform and defining the periphery of at least 40% of the circumference of the platform, h) An opening in the platform, i) An inner circumferential wall extending upwardly from the platform around at least 40% of the circumference of the opening, One or more protuberances extending outwardly beyond one or more of the outer walls of the fitment, and the attachment comprising a) a platform, b) one of i) an opening or ii) a removable cover, disposed within the platform, c) an inner ring extending downwardly from the platform and encircling at least 40% of the circumference of the opening or cover, d) an outer ring spaced from the inner ring and encircling at least 40% of the circumference of the inner ring, e) the attachment being fit onto a fitment wherein the fitment inner circumferential wall is received between the inner and outer rings.

55. The combined fitment and attachment of claim 54 in combination with a product chamber wherein the product chamber comprises side walls terminating in an upper edge, the one or more fitment protuberances comprising at least two protuberances, the at least two protuberances resting on the upper edge of the product chamber.

56. The attachment according to claim 48 wherein the attachment platform includes rectilinear side Walls are disposed interiorly of the side Walls of the fitment.

57. The attachment according to claim 49 wherein the attachment includes rectilinear side Walls which are disposed interiorly of the side Walls of the fitment.

58. The attachment according to claim 53 wherein the attachment includes rectilinear side Walls and the attachment side Walls are disposed interiorly of the side Walls of the fitment.

It should be understood, of course, that the specific forms of the invention herein illustrated and described are intended to be representative only as certain changes may be made therein without rting from the clear teachings of the disclosure. Accordingly, reference should be made to the following appended claims in determining the full scope of the invention.

The invention claimed is:

1. A refill container having a product chamber and a discrete fitment attached thereto, the fitment having a resting surface, the fitment being adapted to be used with a variety of outer package shells having a support surface on which the fitment resting surface can be supported whereby the refill container can be utilized for different brands or product concepts, the fitment including a centrally disposed cylindrical opening defined by a cylindrical wall which extends above a platform and including one or more recesses on the fitment cylindrical wall above the platform to assist in snapping the fitment on to a neck of the product chamber, the fitment having front, rear and side walls extending above the platform wherein the walls afford a surface on which the fitment can be supported.

2. The refill container according to claim 1 wherein the fitment further comprises peripheral walls including front, rear and side walls extending above and below the fitment platform.

3. The refill container according to claim 2 wherein the fitment further comprises peripheral wall protuberances which extend outwardly beyond the fitment peripheral walls.

4. The refill container according to claim 1 in combination with a closure having a base and an underside to the base, the underside including an inner ring and an outer ring spaced to accommodate the cylindrical wall of the fitment therebetween when the base is affixed to the fitment.

5. The refill container according to claim 4 wherein the closure is a) a flip top closure or b) a closure having a platform and a cylindrical bottle neck which includes threads on the outside or c) a destructive closure.

6. The refill container according to claim 5 wherein the closure is a flip top closure.

7. The refill container according to claim 1 wherein the walls include upwardly and outwardly extending corners which afford the surface on which the fitment can be supported.

* * * * *